Jan. 20, 1953  R. R. CROOKSTON  2,626,127
AUTOMATIC CONTROL SYSTEM FOR WELL DRILLING
Filed Oct. 8, 1948  9 Sheets-Sheet 1

Robert R. Crookston, INVENTOR
BY
J. S. McKean
ATTORNEY.

BASIC UNIT I

Jan. 20, 1953 R. R. CROOKSTON 2,626,127
AUTOMATIC CONTROL SYSTEM FOR WELL DRILLING
Filed Oct. 8, 1948 9 Sheets-Sheet 3
FIG. 3.
BASIC UNIT I
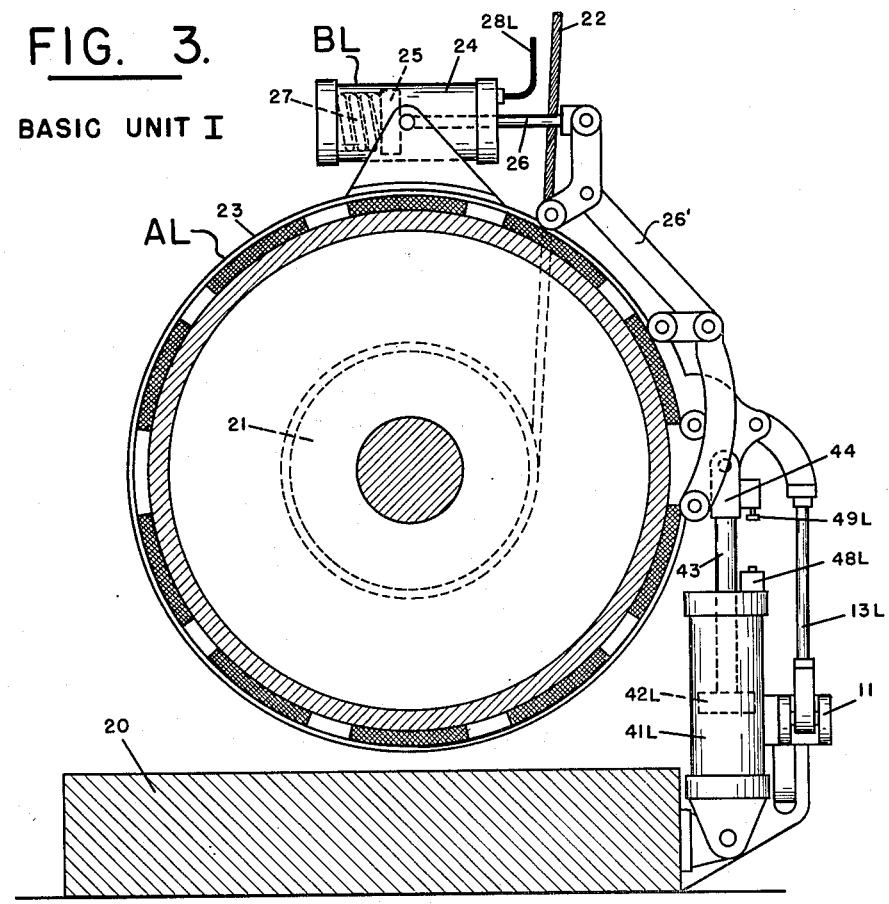
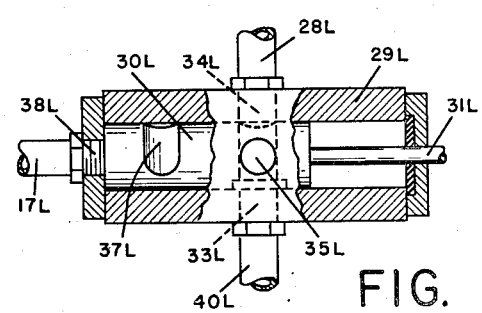
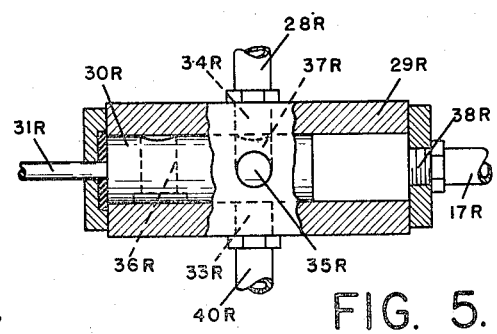
FIG. 4.  FIG. 5.
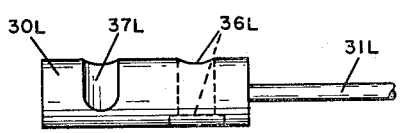
FIG. 6.
Robert R. Crookston, INVENTOR.
BY
J. G. McKean
ATTORNEY.

WEIGHT CONTROL UNIT II

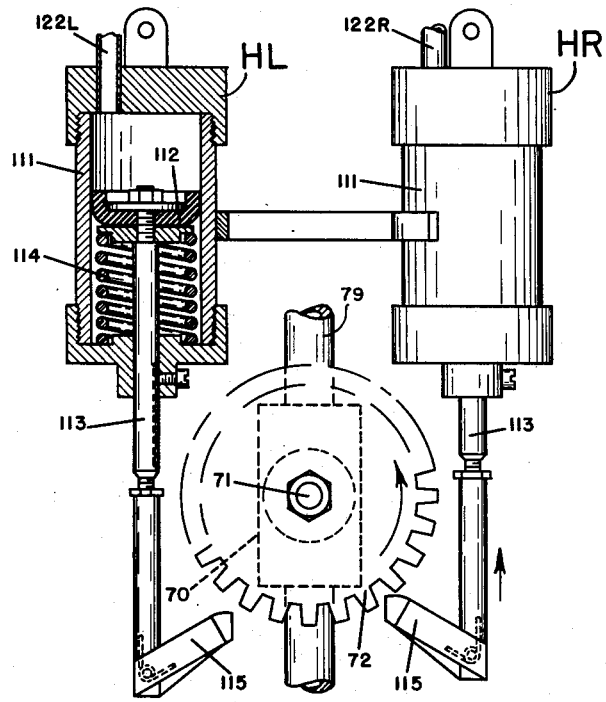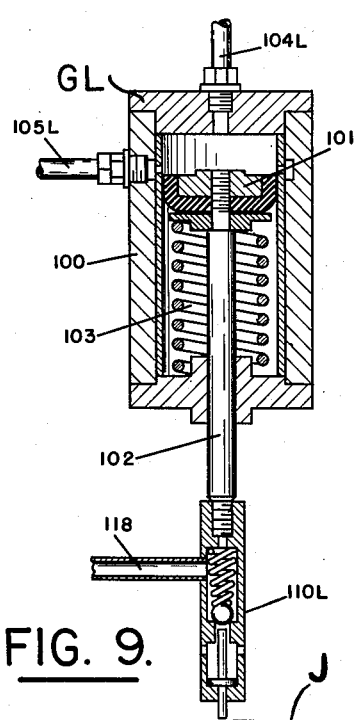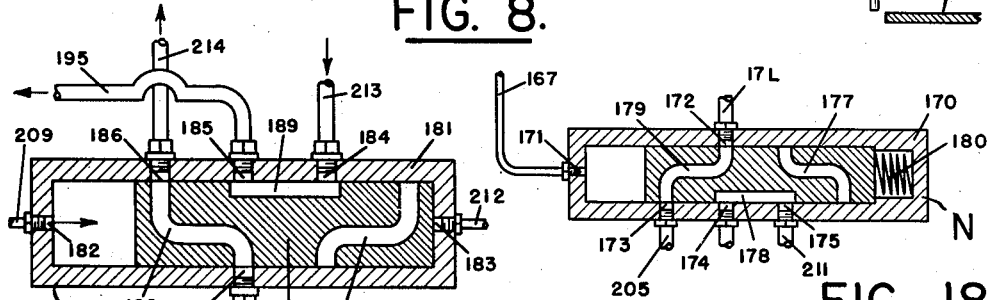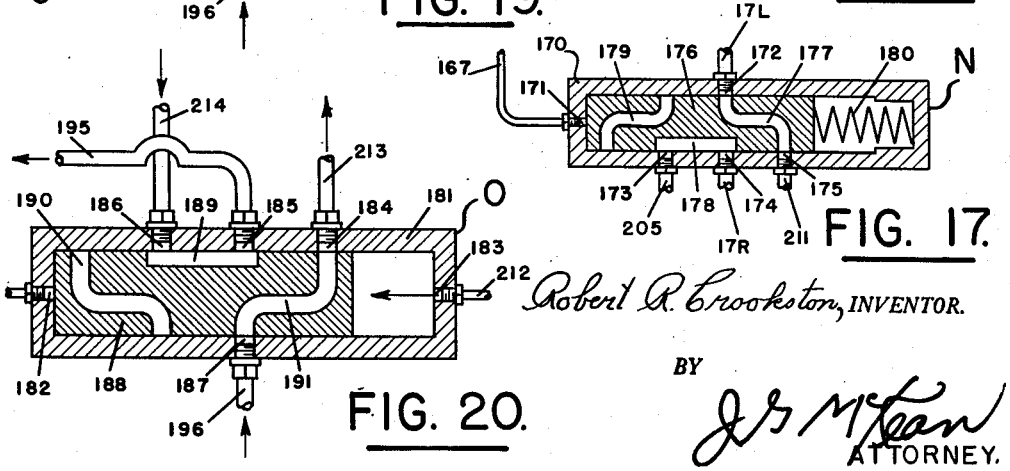

Jan. 20, 1953   R. R. CROOKSTON   2,626,127
AUTOMATIC CONTROL SYSTEM FOR WELL DRILLING
Filed Oct. 8, 1948   9 Sheets-Sheet 6
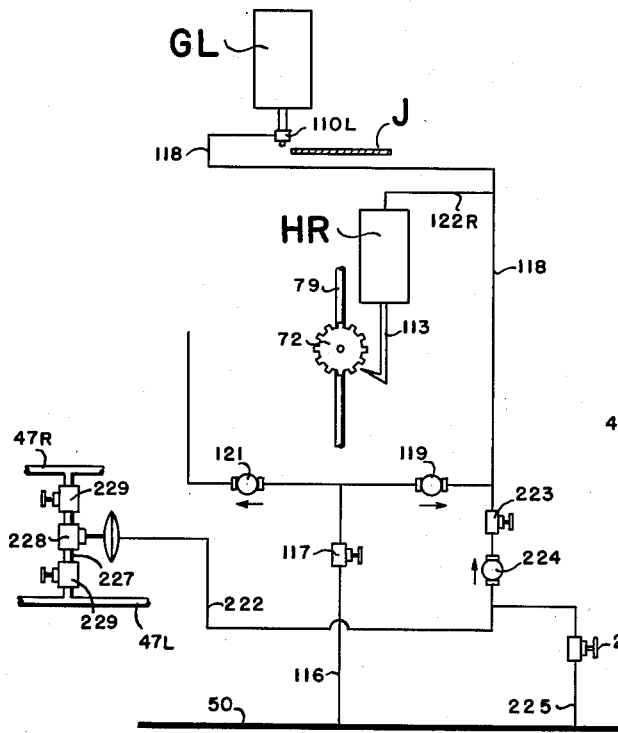
FIG. 13.
QUICK APPLICATION UNIT III
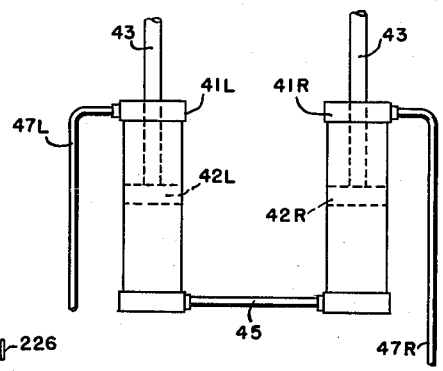
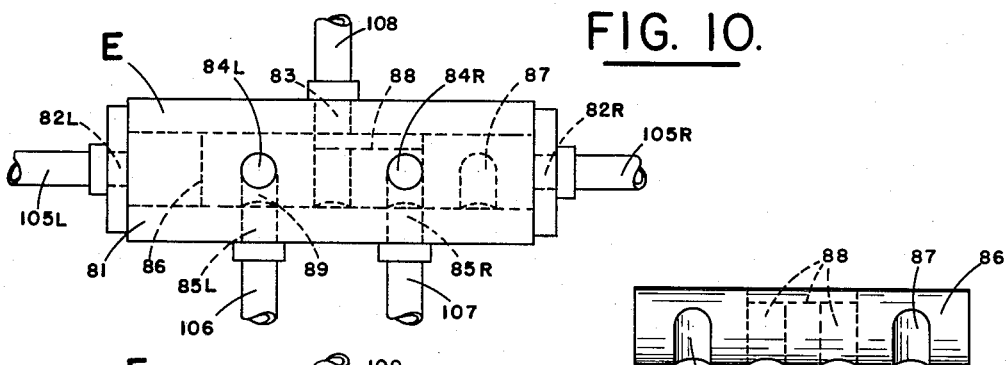
FIG. 10.
FIG. 12.
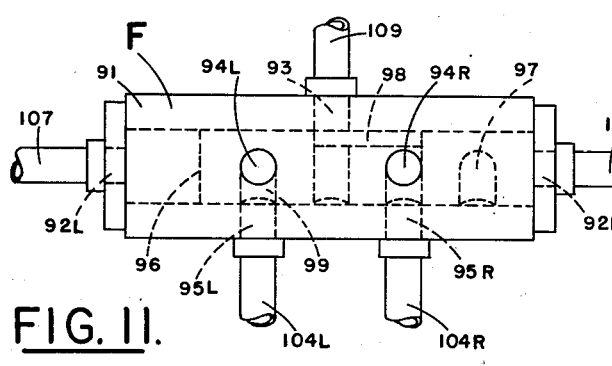
FIG. 11.
Robert R. Crookston,
INVENTOR.
BY
J. S. McKean
ATTORNEY.

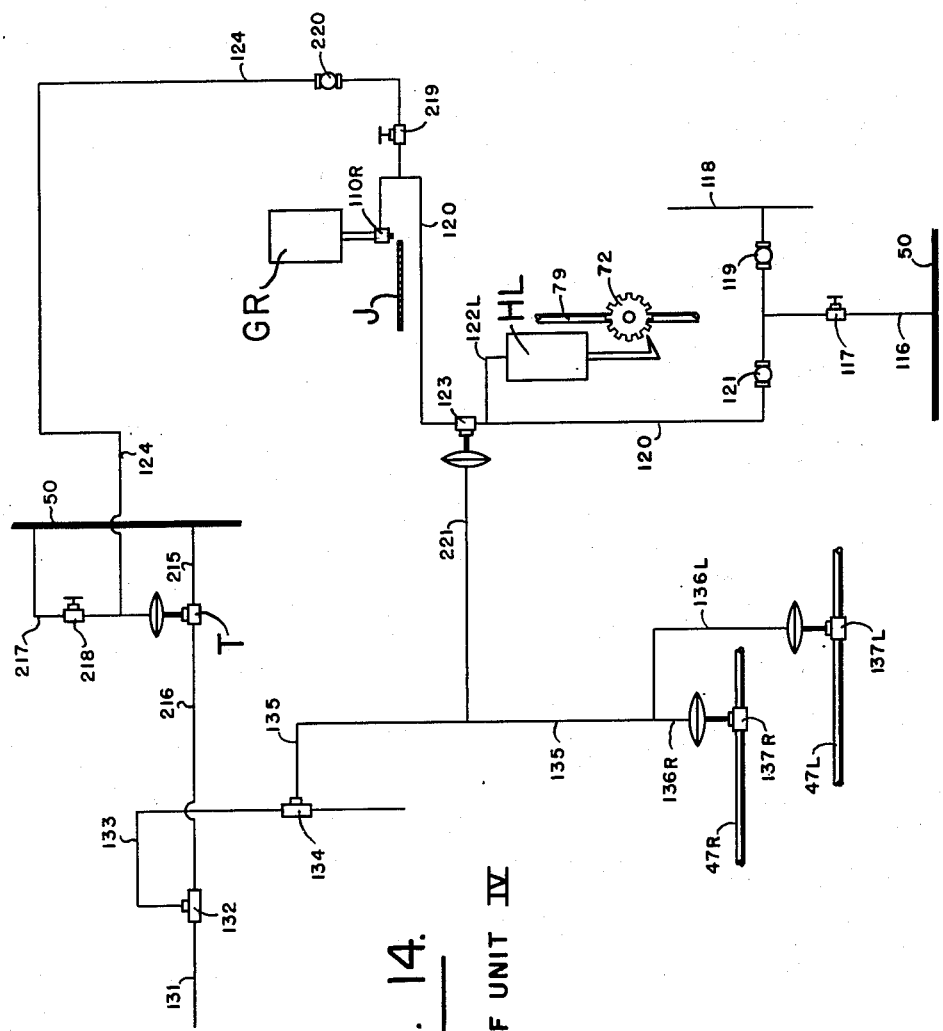

Jan. 20, 1953 R. R. CROOKSTON 2,626,127
AUTOMATIC CONTROL SYSTEM FOR WELL DRILLING
Filed Oct. 8, 1948 9 Sheets-Sheet 8

TORQUE CONTROL UNIT V

Robert R. Crookston, INVENTOR.
BY J B McLean
ATTORNEY.

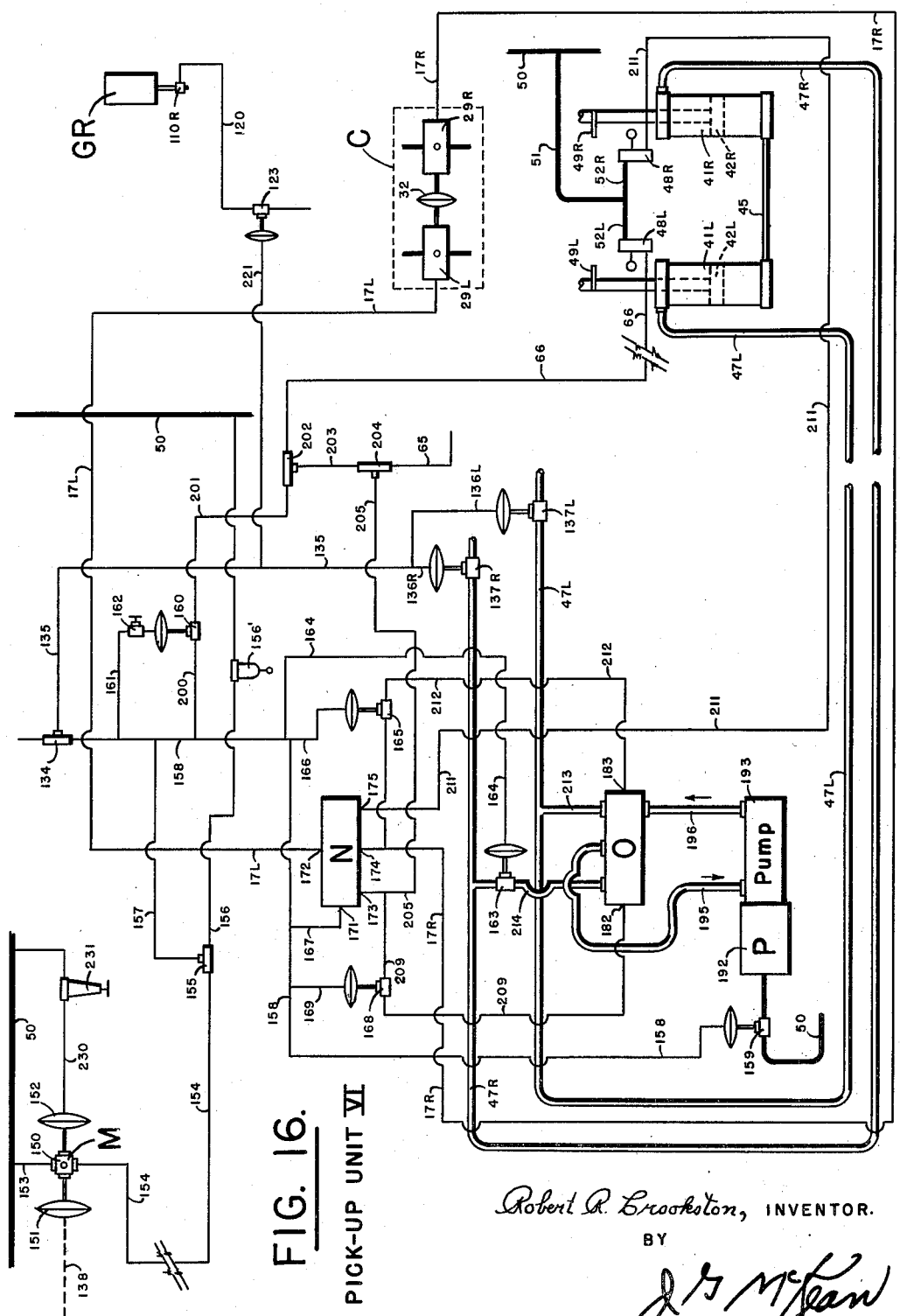

Patented Jan. 20, 1953

2,626,127

UNITED STATES PATENT OFFICE 2,626,127

AUTOMATIC CONTROL SYSTEM FOR WELL DRILLING

Robert R. Crookston, Houston, Tex., assignor, by mesne assignments, to Standard Oil Development Company, Elizabeth, N. J., a corporation of Delaware Application October 8, 1948, Serial No. 53,393

4 Claims. (Cl. 255—19)

The present invention is directed to a system for controlling the operation of a rotary drilling rig.

In the drilling of holes in the earth for the production of petroleum and gas it is common to employ a rotary drilling rig. The drilling rig includes a derrick provided with a crown block, a hoisting drum which is mounted adjacent the derrick, a traveling block and a drilling line having one end secured to the hoisting drum and arranged to suspend the traveling block from the crown block so that the traveling block may be moved vertically by the hoisting drum. The traveling block is arranged to suspend either part or all the weight of the drill stem having the drill bit attached to its lower end. An engine is provided for rotating a rotary table which in turn is arranged for rotating the drill stem.

Because of the limitations of the strength of materials employed in the construction of the equipment, the torque exerted on the drill bit should not exceed a fixed value. When the drilling is proceeding uniformly the torque on the drill stem may be regulated by adjusting the weight carried by the drill bit. However, it sometimes happens that the torque on the drill stem becomes excessive even though the weight allowed to rest on the drilling bit is no greater than normal. Accordingly, it is necessary to take into consideration both the weight supported by the drilling line and the torque exerted on the drill stem by the drilling engine in order to obtain efficient use of the drilling rig without subjecting parts of the drilling rig to an excessive strain. Ordinarily the different sedimentary deposits differ in the ease with which they may be drilled and this in turn causes the rate at which the hole is deepened to vary continually. The great length of the drill stem in proportion to its diameter gives it considerable flexibility but for efficient operation it is desirable for the upper end of the drill stem to follow closely the action of its lower end carrying the drill bit. Accordingly, it is necessary to vary the rate at which the drill stem is being lowered. That is to say, continual adjustment is necessary in order to lower the drill bit at such a rate as to maintain enough weight on the bit to insure a satisfactory rate of penetration without subjecting the drill stem to an excessive amount of torque.

It is an object of the present invention to provide a system for controlling a rotary drilling rig which is responsive to the weight being carried by the drilling line and to the torque exerted by the drilling engine.

It is another object of the present invention to provide a system for controlling a rotary drilling rig responsive to the weight carried on the drilling line and the torque exerted by the drilling engine, the weight control system taking command and inactivating the torque control while drilling conditions are normal and the torque control taking command and inactivating the weight control when the torque exceeds a normal value.

A further object of the present invention is to provide a system for automatically picking up the drill stem when the torque exerted on the drill stem by the drilling engine exceeds a predetermined value.

Another object of the present invention is to provide a system for controlling the operation of a rotary drilling rig having means for controlling the rate at which the drill stem is lowered as a function of the weight carried by the drilling line during normal operations, means for holding the drill stem against vertical movement when the torque exerted by the drilling engine on the drill stem exceeds a predetermined first value and means to pick up the drill stem when the torque exerted on the drill stem by the drilling engine exceeds a predetermined second value greater than said first value.

Other objects and advantages of the present invention may be seen from the following description taken in conjunction with the drawing, in which:

Fig. 3 is a side view, partly in section, of basic unit I, shown in Fig. 2;

Fig. 4 is an elevation, partly in section, showing details of construction of a valve of basic unit I also shown in Figs. 1 and 2;

Fig. 5 is an elevation, partly in section, showing details of construction of another valve of basic unit I also shown in Figs. 1 and 2;

Fig. 6 is an elevation of the valve element of Fig. 4 removed from the valve body in order to show its details of construction more clearly;

Fig. 8 is in the form of an elevation, partly in section, showing details of construction of portions of weight control unit II which parts are shown in larger scale than in Figs. 1 and 7;

Fig. 9 is an elevation, partly in section, showing details of construction of another portion of weight control unit II;

Fig. 10 is an elevation showing the details of construction of a valve of weight control unit II also shown in Figs. 1 and 7;

Fig. 11 is an elevation showing details of construction of a valve of weight control unit II which valve is also shown in Figs. 1 and 7;

Fig. 12 shows the valve element of Fig. 10 removed from the valve body in order to show the details of construction more clearly;

Fig. 13 is in the form of a flow sheet showing quick application unit III of the control system with the parts of the unit shown in the same relative positions they occupy in Fig. 1 but somewhat enlarged;

Fig. 14 is in the form of a flow sheet showing drill-off unit IV of the control system with the parts of the unit shown in the same relative positions they occupy in Fig. 1 but somewhat enlarged;

Fig. 16 is in the form of a flow sheet showing pick-up unit VI of the control system with the parts of the unit shown in the same relative position they occupy in Fig. 1 but somewhat enlarged;

Fig. 17 is in the form of an elevation, partly in section, showing the details of construction of a valve of pickup unit VI which valve is also shown in Figs. 1 and 16;

Fig. 18 is a view of the valve of Fig. 17 with a valve element in a different position;

Fig. 19 is an elevation, partly in section, showing details of construction of another valve of pickup unit VII which valve is also shown in Figs. 1 and 16; and Fig. 20 is a view of the valve of Fig. 19 with the valve element occupying a different position.

It is to be remembered that in order to illustrate more clearly the system, separate parts thereof have not been shown in the same scale and some parts have been shown more or less distorted. In order to aid in tracing the flow of fluids through the system, the conduit for supplying compressed air used as a source of power for the system is shown as a heavy black line, pilot lines for carrying compressed air to control elements are shown as thin black lines and conduits for carrying hydraulic liquids are shown by double lines.

Also for the purpose of simplifying the description, assemblies or units which cooperate to make up the complete system have been designated by Roman numerals, important sub-assemblies included in the units are designated by letters, while the parts of the important sub-assemblies and the remaining parts making up the complete system are designated by numbers.

The complete system consists of a basic unit I which is a power activated means for controlling the pay-off of a hoisting drum; weight control unit II which is capable of automatically controlling basic unit I as a function of the weight supported from the hoisting drum; quick application unit III which cooperates with basic unit I and weight control unit II and may be considered auxiliary to weight control unit II; drill-off unit IV which cooperates with basic unit I and weight control unit II and may be considered auxiliary to weight control unit II; torque control unit V capable of automatically controlling basic unit I as a function of the torque exerted by the drilling engine; and pick-up unit VI which is capable of reversing the operation of basic unit I so that the drill stem is picked up when the torque exerted by the drilling engine exceeds a predetermined value.

The system is arranged so that there is not any conflict in command in the operation of the unit. That is to say, when either of the principal control units, weight control unit II, torque control unit V or pick-up unit VI, takes command it has full command until it relinquishes command to another unit. Moreover, the operator or driller may assume the controls of basic unit I at any time and when he does so he assumes command and the automatic control units II, III, IV, V and VI are inactivated.

Figure 1:
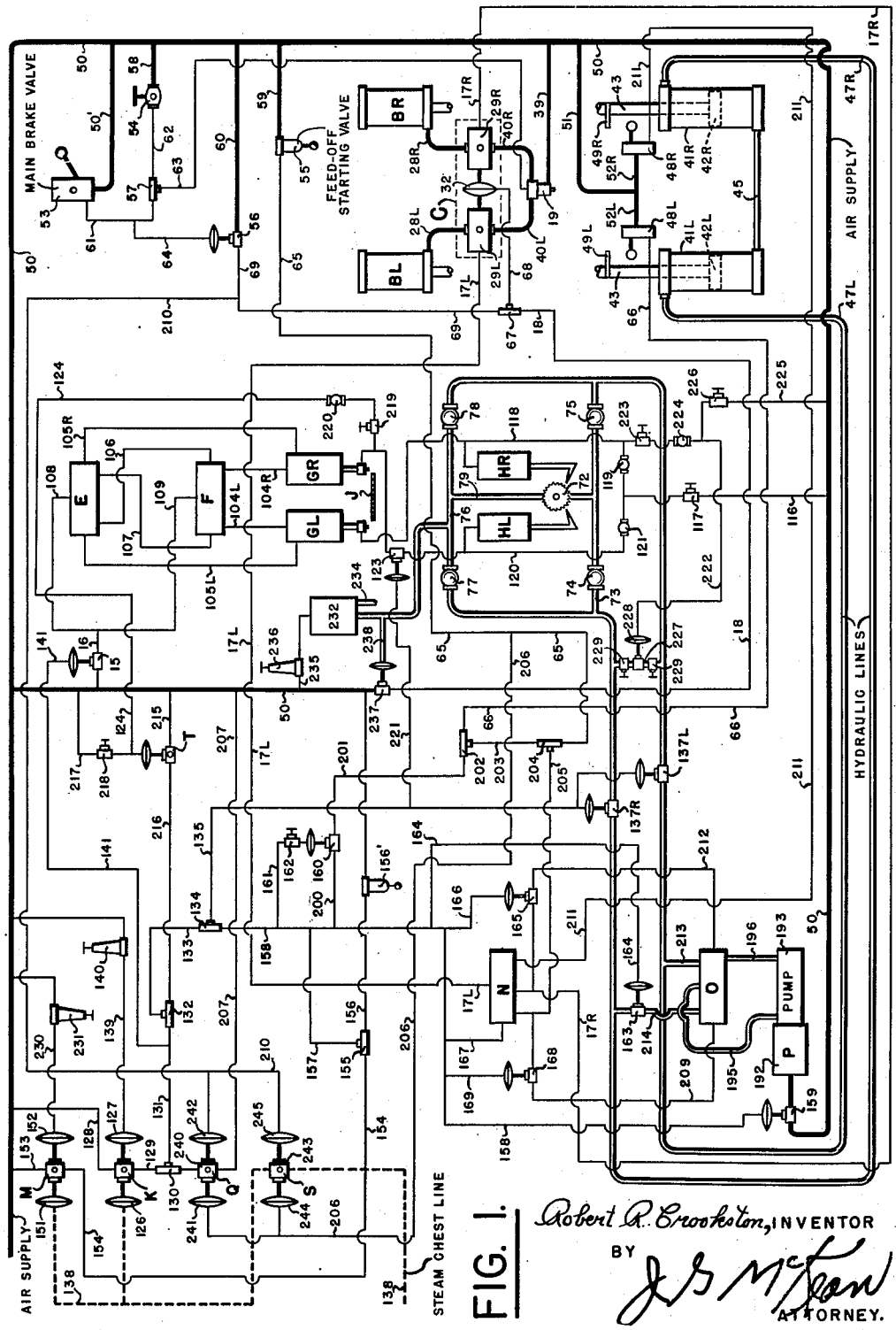
Fig. 1 is in the form of a diagrammatic flow sheet showing the control system of the present application.

Considering now the entire system as shown in Fig. 1, compressed air or similar inert gas is supplied from a suitable source, such as an air compressor, not shown in the drawing, through main air line 50. The hydraulic lines 47L and 47R carry hydraulic fluid; lines 47L and 47R provide a means whereby the weight control unit II, drill-off unit IV, torque control unit V, and pick-up unit VI are able to control automatically the operation of the basic unit I while by-pass hydraulic line 227 connecting lines 47R and 47L carries hydraulic fluid and provides a means whereby quick application unit III applies a control to the operation of basic unit I.

It may be mentioned that units and parts adapted to be employed in the system of the present application are described and claimed in my co-pending applications. Application Serial No. 691,486, filed August 19, 1946, entitled "Brake Assembly" and Serial No. 26,843, filed May 13, 1948, entitled "Power Brakes for Hoisting Drum," describe and claim embodiments of brakes and pay-off control means for a hoisting drum. Application Serial No. 693,992, filed August 30, 1946, entitled "Valve Assembly" describes and claims an embodiment suitable for use as master valve assembly C while application Serial No. 26,842, filed May 13, 1948, entitled "Fluid Control System" describes and claims an arrangement suitable for use as main brake valve 53. Embodiments of weight control unit II, quick application unit III and drill off unit IV are described and claimed in my copending application, Serial No. 70,765, filed January 13, 1949, entitled "Automatic Weight Control Device."

Figure 2:
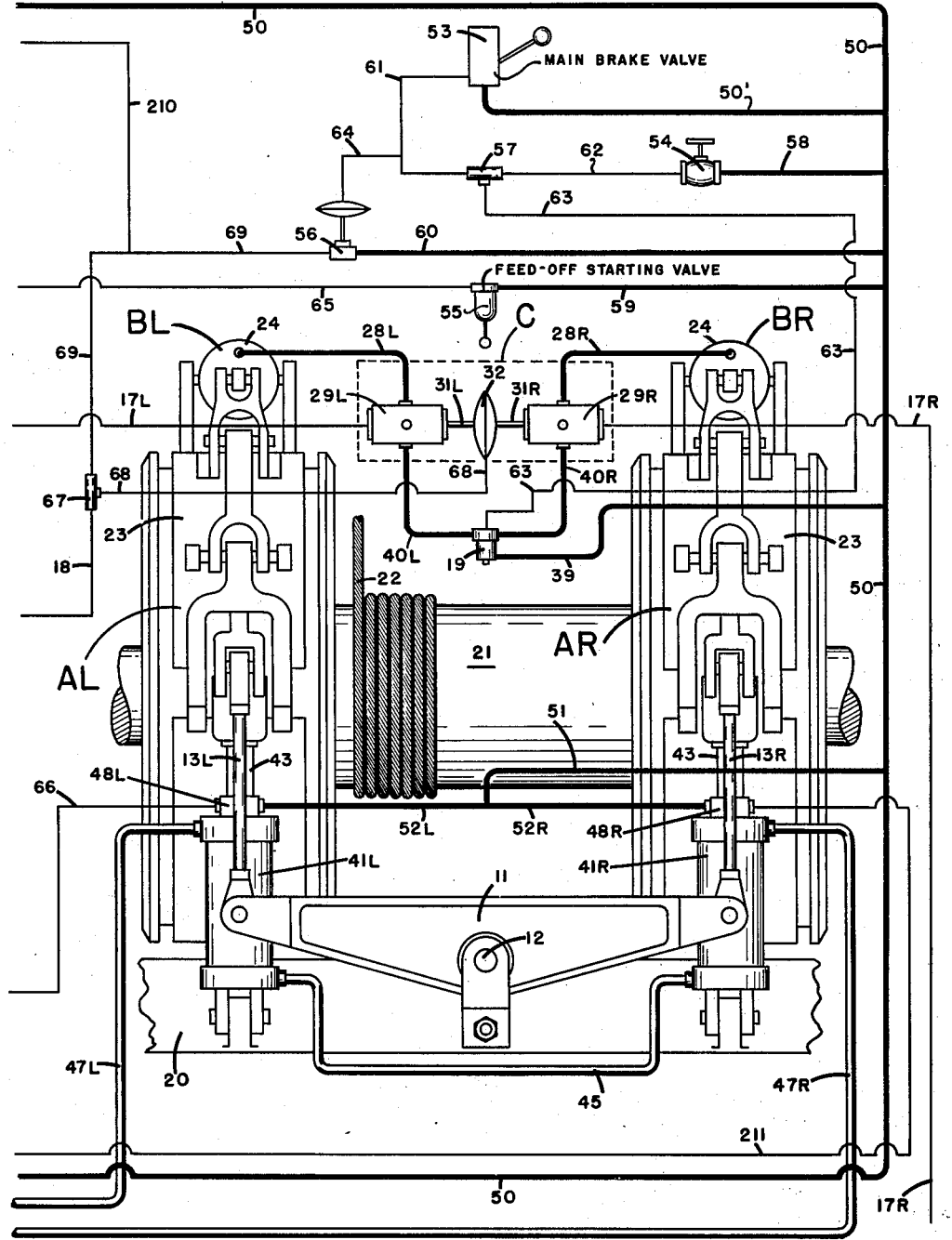
Fig. 2 is a front elevation, showing details of the construction of basic unit I of the control system.

The basic unit I will now be described in detail. The important elements of this unit are shown in the relative positions they occupy in the complete system in Fig. 1 while details of construction including the hoisting drum are shown in Figs. 2 and 3 and details of construction of valves of this unit are shown in Figs. 4, 5, and 6.

Brake band assemblies AL and AR are mounted on hoisting drum 21 for limited arcuate movement with respect thereto. Lever II is mounted on frame 20 and is arranged to pivot around its center 12 and serves as a means for connecting the brake band assemblies to the frame with one end connected to brake band assembly AL through linkage 13L and its other end connected to brake band assembly AR through linkage 13R.

Brake band assembly AL consists of brake band 23 with power assembly BL mounted thereon and brake band assembly AR consists of a similar brake band 23 with power assembly BR mounted thereon. The power assemblies BL and BR are identical and each consist of brake cylinder 24, piston 25, piston rod 26, and spring 27. The piston is slidably arranged in the cylinder and the cylinder is mounted on one end of brake band 23 while the end of piston rod 26 is secured to the other end of the brake band through linkage 26'. The spring 27 is arranged in the cylinder between piston 25 and the piston end of the cylinder so that it biases the piston toward the piston rod end of the cylinder.

In the power assembly BL the head end of cylinder 24 has a port connected to inlet line 28L for the admittance and release of compressed air. In the power assembly BR the cylinder 24 has a port connected to inlet line 28R for the admittance and release of the power fluid.

The brake band assembly AL is also connected to the frame 20 by a hydraulic assembly consisting of cylinder 41L with piston 42L slidably mounted therein and connected through piston rod 43 and linkage 44 to the brake band 23. Brake band assembly AR is similarly attached to frame 20 through a hydraulic assembly consisting of cylinder 41R and piston 42R slidably mounted therein and connected through piston rod 43 and linkage 44 to brake band 23.

The cylinders 41L and 41R of assemblies AL and AR respectively define ports at their piston ends and head ends. The ports of the piston ends of the cylinders are fluidly connected by conduit 45. The head end of cylinder 41L is connected to conduit 47L and the head end of cylinder 41R is connected to conduit 47R, these conduits being connected by a manifold consisting of lines 73, 79 and 76 and by by-pass line 227. Line 47R is provided with diaphragm-operated valve 137R and similarly line 47L is provided with diaphragm-operated valve 137L.

In effect the cylinder and piston assemblies 41L, 42L and 41R, 42R comprise a multi-cylinder pump mechanically connected to hoisting drum 20.

A pilot valve 48L is mounted on cylinder 41L of assembly AL and is arranged to be operated by contact with activator 49L. Similarly, a pilot valve 48R is mounted on cylinder 41R of the assembly AR and is arranged to be operated by contact with activator 49R.

Basic unit I also includes a master valve assembly C having valve bodies 29L and 29R and diaphragm 32. The parts of the two valve bodies 29L and 29R have the same relationship as the right and left hands of a person.

Valve body 29L defines an inlet port 33L, an outlet port 34L, exhaust port 35L and pilot line port 38L. Valve element 30L is slidably arranged in valve body 29L and has a rod 31L connected thereto and projecting through a packed opening in the right end of the valve body. Valve element 30L defines transversely extending passages 36L and 37L. When valve element 30L is in its left position, passage 36L fluidly connects inlet port 33L with outlet port 34L and when it is in its right position passage 37L fluidly connects outlet port 34L with the exhaust port 35L.

Valve body 29R has a valve element 30R slidably arranged therein with a rod 31R connected thereto. Valve body 29R defines inlet port 33R, outlet port 34R, exhaust port 35R, and pilot line port 38L. Valve element 30R defines passages 36R and 37R. When the valve element 30R is in its right position, passage 36R fluidly connects inlet port 33R with outlet port 34R and when the valve element is in its left position, passage 37R fluidly connects outlet port 34R with exhaust port 35R.

Compressed air is supplied from main air line 50 through branch 39 to a bleeder type relay valve 19 which in turn is connected by branch lines 40L and 40R to inlet ports 33L and 33R, respectively. A diaphragm 32 is arranged between valve bodies 29L and 29R with one side of the diaphragm connected to rod 31L and the other side connected to rod 31R.

Air to activate master valve assembly C is supplied by pilot lines 68, 17R and 17L. Pilot line 68 is connected to diaphragm 32. Pilot line 17L is connected to pilot line port 38L of valve body 29L and pilot line 17R is connected to pilot line port 38R of valve body 29R.

Figure 15:
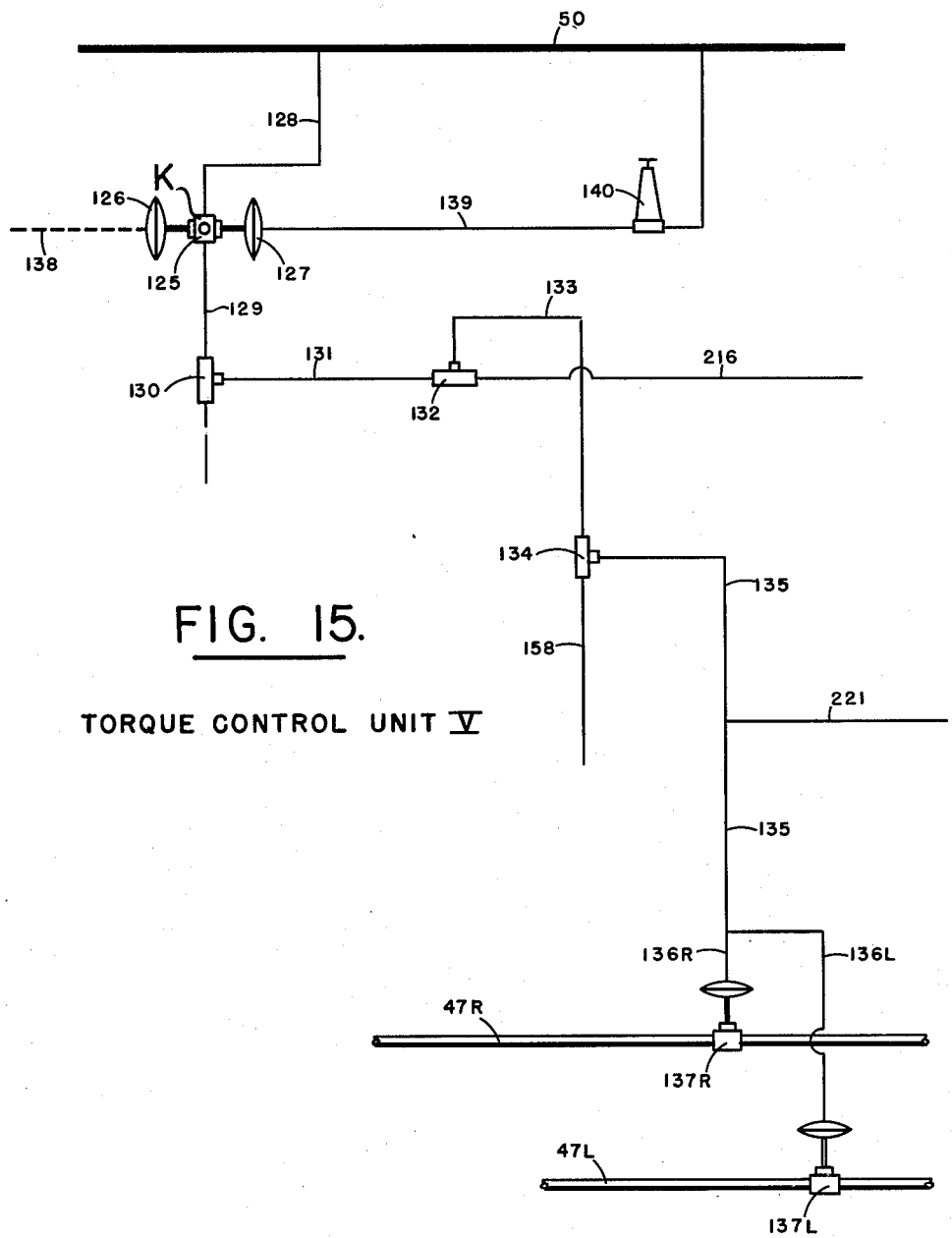
Fig. 15 is in the form of a flow sheet showing torque control unit V with the parts of the unit shown in the same relative position shown in Fig. 1 but somewhat enlarged.

When the hoisting drum 21 is paying out drilling line as it is normally operated, the operation of master valve assembly C is controlled by pilot valves 49L and 49R. The fluid connection between master valve assembly C and pilot valves 49L and 49R is through valve N which forms a part of the pick-up unit IV but this unit is inactivated when the movable part of valve N is in the position shown in Fig. 15. Tracing the flow when the pick-up unit IV is inactivated and the valve element of valve N is in the position shown in Fig. 17, pilot valve 48L is connected through pilot line 66, double check valve 202, pilot line 203, double check valve 204, pilot line 205, valve N and pilot line 17R to the end port 38R of master valve assembly C. Similarly, pilot valve 48R is connected through pilot line 211, valve N and pilot line 17L to port 38L of valve body 29L of master valve assembly C.

The means for manually controlling basic unit I are main brake valve 53, which is of the bleeder regulator type, manually adjustable valve 54, and feed-off starting valve 55. The inlet of main brake valve 53 is connected through branch line 50' to main air line 50. The outlet of main brake valve 53 is connected through pilot line 61 to an inlet of double check valve 57 and through pilot line 61 and pilot line 64 to the diaphragm of diaphragm valve 56. The inlet of manually controlled valve 54 is connected through branch line 58 to main air line 50 while its outlet is connected through pilot line 62 to an inlet of double check valve 57. The outlet of double check valve 57 is connected through pilot line 63 to bleeder type relay valve 19. The inlet of diaphragm valve 56 is connected to main air line 50 by branch line 60 while its outlet is connected by pilot line 69 to an inlet of double check valve 67 and by pilot line 69 and pilot line 210 to diaphragm 242 of double diaphragm valve Q and diaphragm 245 of double diaphragm valve S. The outlet of double check valve 67 is connected through pilot line 68 to diaphragm 32 of master valve assembly C.

Feed-off starting valve 55 has its inlet connected by branch line 59 to main air line 50 and its outlet connected to pilot line 65, double check valve 204, pilot line 205, valve N and pilot line 17L to inlet 38L of master valve assembly C. Feed-off starting valve 55 is also connected through pilot lines 65 and 206 to diaphragm 241 of double diaphragm valve Q and diaphragm 244 of double diaphragm valve S.

In order to maintain a supply of hydraulic fluid in the system to compensate for loss of fluid, as by leakage and the like, a reservoir 232 has an outlet line 233 fluidly connected to line 76 of the manifold which connects hydraulic lines 47L and 47R. This manifold consists of line 73 provided with check valves 74 and 75, line 76 provided with check valves 77 and 78, and line 79 containing needle valve 70. The line 76 to which reservoir 233 is connected is the low pressure side of valve 71 in the manifold. The inlet 234 of the reservoir may be connected to any suitable source of supply of hydraulic fluid, not shown on the drawing. The fluid in reservoir 232 is maintained under a constant pressure. In the drawing the constant pressure is maintained on reservoir 232 by a branch line 235 containing regulator 236 which connects the upper portion of the reservoir with main air line 50. As a safety feature, a diaphragm valve 237 has its inlet in communication with main air line 50 and its outlet connected through pilot line 18, double check valve 67 and line 68 to diaphragm 32 of master valve assembly C of basic unit I. The diaphragm of valve 237 is connected through branch line 238 to line 233 of the hydraulic system. With this arrangement any dangerous loss of pressure from the hydraulic system will allow diaphragm 237 to open which allows compressed air from main line 50 to escape through pilot line 18, double check valve 67 and line 68 to diaphragm 32 of master valve C which in turn activates the master valve C and stops rotation of the hoisting drum.

Figure 7:
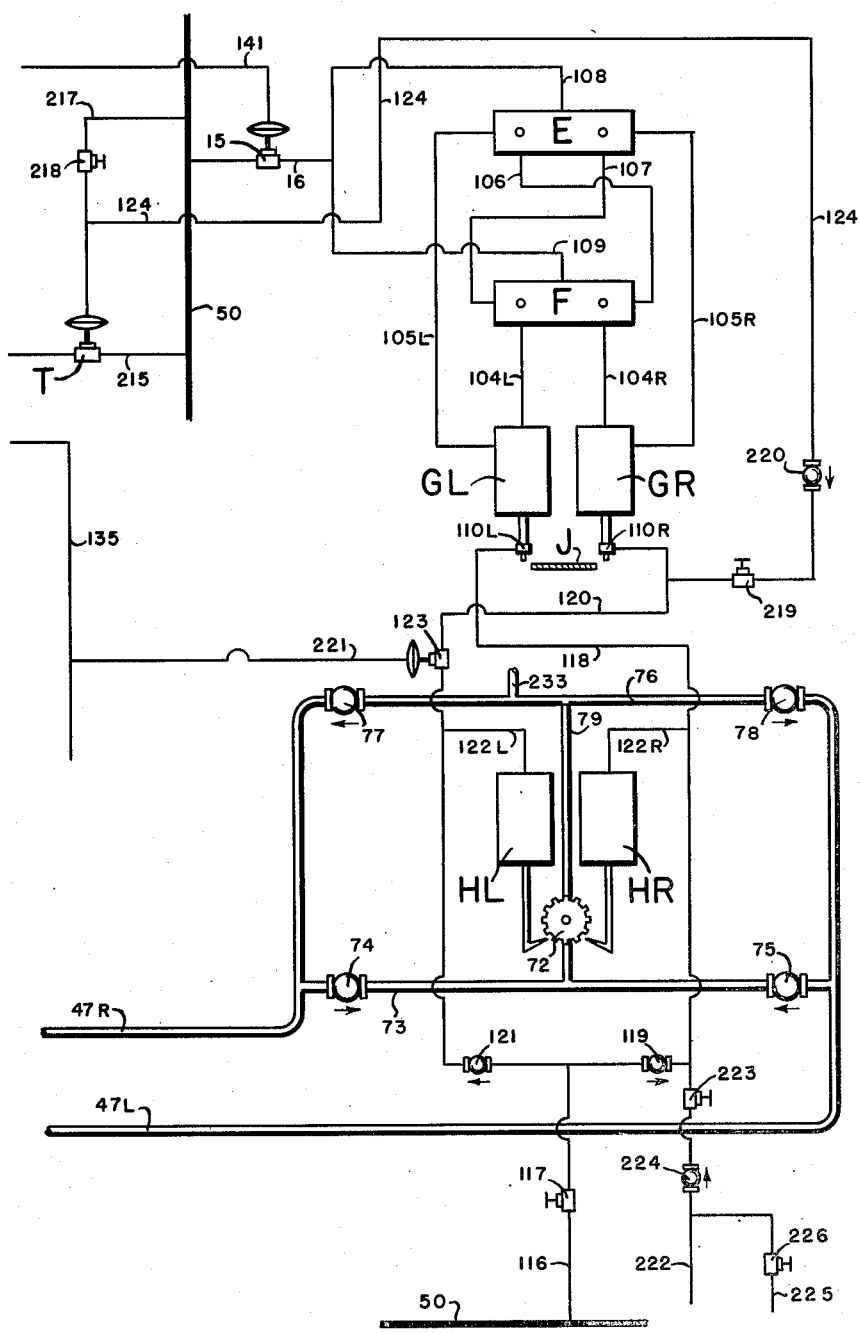
Fig. 7 is in the form of a flow sheet showing weight control unit II of the control system with the parts of the unit shown in the same relative positions they occupy in Fig. 1 but somewhat enlarged.

The weight control unit II is shown in the position it occupies in the complete system in Fig. 1 and is shown separately in Fig. 7 while details of construction of parts thereof are shown in Figs. 8 to 12, inclusive.

The principal parts of weight control assembly II are master valve E, master valve F, motor and bleeder assemblies GL and GR, cylinder and piston assemblies HL and HR and a needle J of a weight indicator. It is to be understood that several types of weight indicators are commercially available. Any of the types provided with a weight indicating needle may be used, however, in order to simplify the showing in this application, only the needle of a weight indicator is shown in the drawing.

Compressed air for operating weight control assembly II is supplied from main air line 50 through branch line 16 controlled by diaphragm valve 15 and through branch line 116 controlled by needle valve 117. Control means are provided so that diaphragm valve 15 is controlled by the operation of main brake valve 53 and feed-off starting valve 55. The diaphragm of valve 15 is connected through pilot line 141 and pilot line 131 to the outlet of double check valve 130. An inlet of double check valve 130 is connected to double diaphragm valve Q which, in turn, is connected through line 207 to main air line 50. Diaphragm 241 of double diaphragm Q is connected through pilot lines 206 and 65 to feed-off starting valve 55 while diaphragm 242 of double diaphragm valve Q is connected through pilot lines 210 and 69 to diaphragm valve 56.

Double diaphragm Q is of the bleeder type consisting of valve body 40 and diaphragms 241 and 242. It also includes a valve element, not shown in the drawing, operated by diaphragms 241 and 242. Valve Q is opened by operation of main brake valve 53 which allows the passage of air to diaphragm valve 56 from main air line 50 through line 60, pilot lines 69 and 210 to diaphragm 242 of valve Q. Valve Q is closed by operation of feed-off starting valve 55. When valve Q is closed and the valve elements of double check valve 130 permit communication between diaphragm valve 15 and valve Q, air is bled from pilot lines 141 and 13 and allows valve 15 to open and supply air to weight control unit II. When valve Q is open compressed air is allowed to pass from main air line 50 to pilot line 207, valve Q, double check valve 130 and pilot lines 131 and 141 to the diaphragm of valve 15, closing this valve and preventing the supply of compressed air to power weight control assembly II.

The weight control unit II is arranged to control the flow of hydraulic fluid through the manifold consisting of lines 73, 75, and 79 in which manifold lines 73 and 76 are connected to hydraulic lines 47R and 47L.

Needle valve 70 is arranged to control the flow of fluid through line 79 and is provided with a valve stem 71 on which is mounted a toothed valve wheel 72. Check valves 74 and 75 are arranged in line 73 and similarly check valves 77 and 78 are arranged in line 76. The manifold with its check valves is arranged so that fluid flow through needle valve 70 is unidirectional at all times irrespective of the changes in the direction of flow in lines 47L and 47R. The resistance of needle valve 70 to flow is slightly different when the direction of flow is reversed and in order to insure uniform operating conditions it is desirable to connect the valve through the conduits 47L and 47R by the type of manifold shown rather than by using a single line containing the valve. However, it will be understood that with respect to the principle involved in the control system, a single valve could be used to connect the conduits 47L and 47R.

Master valve assembly E consists of a valve body 81 which defines end pilot ports 82L and 82R. It also defines an inlet port 83, exhaust ports 84L and 84R and outlet ports 85L and 85R. A valve element 86 is slidably mounted within valve body 81 and defines passages 87, 88, and 89. When the valve element 86 is in its right position with respect to the valve body, passage 88 connects inlet port 83 with outlet port 85R while passage 89 connects outlet port 85L with exhaust port 84L. When the valve element 86 is in its left position, passage 88 connects inlet port 83 with the outlet port 85L and passage 87 connects outlet port 85R with exhaust port 84R.

Master valve F consists of a valve body 91 which defines end pilot ports 92L and 92R. It also defines an inlet port 93, exhaust ports 94L and 94R and outlet ports 95L and 95R. A valve element 96 is slidably mounted within valve body 91 and defines passages 97, 98, and 99. When the valve element 96 is in its right position with respect to the valve body, passage 98 connects inlet port 93 with the outlet port 95R while passage 99 connects outlet port 95L with exhaust port 94L. When the valve element 96 is in its left position passage 98 connects inlet port 93 with outlet port 95L and passage 97 connects outlet port 95R with exhaust port 94R.

Each air motor and valve assembly GL and GR consists of a body 100 in which is slidably arranged a piston 101 connected to piston rod 102 with a spring 103 arranged between the piston and the head end of the cylinder to bias the piston away from said head end. Each valve body also defines an end port and a side port.

The end port of body 100 of valve assembly GL is connected by conduit 104L with the outlet port 95L of valve F and the side port of this body is connected through conduit 105L to pilot port 82L at valve E. Similarly, the end port of body 100 of valve assembly GR is connected by conduit 104R to outlet port 95R of valve F and its side port is connected through pilot line 105R to pilot port 82R of valve E.

Valve E also has its outlet port 85L connected through conduit 106 to port 92R of valve F and its outlet port 85R connected through conduit 107 to port 92L of valve F. Compressed air from main air line 50 is supplied through line 16 and branch line 108 to inlet port 83 of valve E and through line 16 and branch line 109 to inlet port 93 of valve F.

A bleeder valve 110L is mounted on piston rod 102 of assembly GL and bleeder valve 110R is mounted on the piston rod of assembly GR.

Assemblies HL and HR each consist of a cylinder 111 with a piston 112 slidably mounted therein. The piston is attached to piston rod 113 and a spring 114 is mounted in the cylinder around the piston rod between the piston and the valve head of the cylinder to bias the piston away from the head end of the cylinder. The piston rod carries a pawl or ratchet member 115 adapted to engage with toothed wheel 72 which activates the needle valve 70.

Compressed air from line 50 is supplied to bleeder valve 110L by way of conduit 116 controlled by valve 117 and branch line 118 containing check valve 119. Compressed air is applied to the bleeder valve 110R from the main air line through conduit 116 and branch line 120 containing check valve 121. Compressed air for operating unit HR is withdrawn from branch line 118 through conduit 112R while air from operating unit HL is withdrawn from branch line 120 through conduit 122L. A diaphragm valve 123 is mounted in branch line 120 between conduit 122L and bleeder valve 110R and a pilot line 124 connects to branch line 120 at a point between diaphragm valve 123 and bleeder valve 110R.

The needle J of a weight indicator (not shown in the drawing) is mounted adjacent the bleeder valves 110L and 110R. The needle is arranged so that when the weight carried by the drilling line is less than a predetermined fixed value, the needle will be moved adjacent one of the bleeder valves, say valve 110R, while if the weight is in excess of predetermined fixed value the needle will be moved adjacent the other bleeder valve 110L. If the weight is within the desired range, needle J will be between the bleeder valves 110L and 110R. When away from its center position, it makes contact either with valve 110L or with valve 110R every time the piston of the air motor reciprocates, and this in turn allows air to bleed from the bleeder valve.

The quick application unit III is shown in the position it occupies with respect to the other portions of the complete system in Fig. 7, and is shown on a larger scale in Fig. 13.

The quick application unit III consists of bypass line 227 provided with diaphragm valve 228, the diaphragm of which is connected to motor and valve assembly GL and actuator assembly HR. Pilot line 222 containing needle valve 223 and check valve 224 connects the diaphragm of valve 227 to line 118 at a point in line 118 between check valve 109 and branch line 122R. At a point in line 222 between check valve 224 and the diaphragm of valve 228, a branch line 225 controlled by needle valve 226 connects said line 222 to main air line 50. By-pass line 227 is connected in parallel with the manifold consisting of lines 73, 76 and 79 (containing needle valve 71) inasmuch as by-pass line 227 and the manifold each fluidly connect hydraulic lines 47R with line 47L. Diaphragm valve 228 is adapted to assume either a full open or an entirely closed position. By-pass line 227 is provided with a needle valve 229 to allow the rate of flow to be adjusted when diaphragm valve 228 is in its open position.

The drill off assembly IV which cooperates with basic assembly I and weight control assembly II is shown in the position it occupies in the complete system in Fig. 1 with the parts shown on a larger scale than Fig. 14. Drill-off unit IV consists of diaphragm valve T connected to double check valve 132, double check valve 134, diaphragm valves 137R and 137L and diaphragm valve 123.

The inlet of diaphragm valve T is connected to main air line 50 through branch line 215. The outlet of valve T is connected through line 216 to an inlet of double check valve 132. The outlet of double check valve 132 is connected through line 133 to double check valve 134 whose outlet in turn is connected through line 135 and branch lines 136R and 136L to diaphragm valves 137R and 137L, respectively, which valves control the flow of hydraulic fluid through hydraulic lines 47R and 47L. The diaphragm of diaphragm valve T is connected through pilot line 217, controlled by needle valve or orifice 218, to main air line 50. A branch pilot line 124 containing a needle valve 219 and check valve 220 connects line 217 at a point between needle valve 218 and the diaphragm of valve T with line 120, which line connects bleeder valve 110R or weight control unit II with a source of compressed air. The check valve 220 is arranged in line 124 to prevent flow of air from line 120 into line 124 in case the pressure in line 124 becomes lower than that in line 120. Diaphragm valve 123 is counted in line 120. The diaphragm of this valve is connected through pilot line 221 to line 135. The torque control unit V and the pickup unit VI are activated by fluctuations of pressure in the steam chest of the drill engine (not shown in the drawing). As indicated in Fig. 1, line 138, the steam chest line, is adapted to be connected to the steam chest of the drilling engine and is controlled by double diaphragm valve S. The torque control unit V is activated by fluctuations in the steam chest by the connection of diaphragm 126 of double diaphragm valve K with steam chest line 138, while the pickup unit VI is activated by the connection of diaphragm 151 of double diaphragm valve M with steam chest line 138.

Double diaphragm valve S is of the bleeder type and consists of valve body 143 with diaphragms 144 and 145. It also includes the valve element (not shown in the drawing) activated by the diaphragms 244 and 245. Diaphragm 244 is connected through pilot lines 206 and 65 to feed off starting valve 55. Diaphragm 245 is connected through pilot lines 210 and 69 to diaphragm valve 56 which is actuated by main brake valve 53 when the pressure applied against diaphragm 244 is greater than that applied against diaphragm 245 valve S is opened. When the pressure applied against diaphragm 245, as by the opening of main brake valve 53, is greater than the pressure applied against diaphragm 244, valve S is closed and bleeds off the air pressure from diaphragms 126 and 151 of double diaphgram valves K and M, respectively. The torque control unit V is shown in the position it occupies in the complete system in Fig. 1 and is shown separately and on an enlarged scale in Fig. 15.

The torque control assembly V includes the double diaphragm bleeder type valve K having body 125 and diaphragms 126 and 127 adapted to operate the movable valve element (not shown in the drawing). The inlet of valve body 125 is connected through branch line 128 to main air line 50. The outlet of valve body 125 is connected through line 129 to an inlet of double check valve 130. It has heretofore been mentioned that the outlet of double check valve 130 is connected through pilot lines 131 and 141 to diaphragm valve 15. The connection of double diaphragm valve K to an inlet of double check valve 130 and through these pilot lines to diaphragm valve 15 causes weight control unit II to be activated when torque control unit III takes command. Pilot line 131 is also connected to an inlet of double check valve 132 which has its outlet connected through conduit 133 to an inlet of double check valve 134. The outlet of double check valve 134 is connected through pilot line 135 and branch lines 136L and 136R to diaphragm valves 137L and 137R which control the flow of hydraulic fluid in lines 47L and 47R, respectively.

The pickup unit VI is shown in the position it occupies in the complete assembly in Fig. 1 and is shown separately on an enlarged scale in Fig. 16 with certain valves of the unit shown in section in Figs. 17, 18, 19, and 20.

The principal parts of pickup unit VI are double diaphragm valve M, master valve N, master valve O and pump P. Compressed air for supplying pump P with power is supplied to pickup unit VI from main air line 50 through diaphragm regulated valve 159. Compressed air for operating the control mechanisms may be supplied from main air line 50 either through pilot 153 controlled by double diaphragm valve M or through pilot line 156 controlled by manually operated valve 156'. The outlet of valve N is connected through pilot line 154 to an inlet of double check valve 155, while pilot line 156 is connected to the other inlet of double check valve 155. Thus, the pickup unit VI may be activated either by the double diaphragm valve M or by manually controlled valve 156'.

Double diaphragm valve M is of the bleeder type with a valve body 150 and diaphragms 151 and 152 adapted to operate the movable valve element (not shown in the drawing). Diaphragm 151 of valve M is connected through line 138 to the steam chest of the drilling engine (not shown in the drawing). Diaphragm 152 of valve M is connected to a supply of air at a constant pressure; in the embodiment shown this is provided by connecting it to main air line 50 through pilot line 230 provided with regulator 231.

It has been heretofore mentioned that air for powering the pickup unit VI passes either through valve M or valve 156' to double check valve 155. The outlet of double check valve 155 is connected through pilot line 157 to pilot line 158. Pilot line 158 has one end connected to an inlet of double check valve 134 and the other end connected to the diaphragm of valve 159. Pilot line 158 is connected through pilot line 166 to the diaphragm of diaphragm valve 165; through pilot line 167 to end port 171 of master valve N and through pilot line 169 to the diaphragm of diaphragm valve 168. Diaphragm valve 160 is of the bleeder type and normally open. Pilot line 158 is also connected through pilot line 161 containing an orifice or bleeder valve 162 to the diaphragm of diaphragm valve 160, through pilot line 200 to the inlet side of diaphragm valve 160.

Double check valve 134 has its outlet connected through pilot line 135 and branch lines 136L and 136R to the diaphragms of diaphragm valves 137R and 137L, respectively, which control the flow of fluid through hydraulic lines 47R and 47L.

Diaphragm valve 160 has its outlet connected through pilot line 201 to an inlet of double check valve 202. Line 66 connects the other inlet side of double check valve 202 with pilot valve 48L of basic unit I. The outlet of double check valve 202 is connected through pilot line 203 to an inlet of double check valve 204. The other inlet of double check valve 204 is connected through pilot line 65 to feed off starting valve 55. The outlet of double check valve 204 is connected through pilot line 205 to port 173 of valve N.

Master valve N includes a valve body 170 which defines an end port 171 and side ports 172, 173, 174, and 175. Slidably mounted within the body is valve element 176 defining passages 177, 178, and 179. Spring 180 is arranged within the valve body to bias movable valve element 176 to the left. When the valve element is in its left position, passage 178 connects port 173 with port 174 and passage 177 connects port 172 with port 175. When the valve element 176 is in its right position, passage 179 connects port 172 with port 173 and passage 178 connects port 174 with port 175.

Master valve O consists of a valve body 181 which defines end ports 182 and 183 and side ports 184, 185, 186, and 187. Valve element 188 is slidably arranged therein and defines passages 189, 190, and 191. When valve element 188 is in its right position passage 189 connects port 184 with port 185 and passage 190 connects port 186 with port 187. When valve element 188 is in its left position, passage 189 connects port 185 with port 186, while passage 191 connects port 184 with port 187.

Master valve N is fluidly connected to master valve O of pickup assembly VI as well as to master valve assembly C of basic unit I. Master valve assembly O is fluidly connected to hydraulic lines 47R and 47L and to pump assembly P. The movement of the valve elements of valve O is controlled by master valve N.

Pump P may be a reciprocating pump of the conventional type with a power end 192 and a pumping end 193. The flow of air into pump P is controlled by diaphragm valve 159 in air supply line 50. Hydraulic line 195 connects port 185 of valve O with the inlet of pump P and hydraulic line 196 connects the outlet of the pump with port 187 of valve O.

Air applied through pilot line 167 to end port 171 of master valve N serves to operate the valve. The movement of master valve O is controlled by air pressure exerted through end ports 182 and 183 at the ends of the valve. End port 182 of master valve O is connected to port 173 of master valve N by means of pilot line 209, controlled by diaphragm valve 168, and pilot line 205. End port 183 of master valve O is connected to port 174 of master valve N through pilot line 212, which is controlled by diaphragm valve 165, and pilot line 212. Port 172 of master valve N is connected through pilot line 17L to valve element 29L of master valve assembly C of basic unit I. Valve O has its port 184 connected through branch line 213 to line 47L carrying hydraulic fluid. Similarly, port 186 of valve O is connected through branch line 214, wich is controlled by diaphragm valve 163, to line 47R which carried hydraulic fluid.

The operation of the several portions of the assembly and their cooperation with one another will now be described.

*Operation of basic unit I*

The operation of basic unit I will first be considered. Briefly, basic unit I is a brake system and feed-off mechanism. An air system is arranged to operate alternately the right and left brake bands during feed-off while drilling with the speed of rotation of the brake drums regulated by the hydraulic system. It will be assumed that the parts are in the relative positions indicated in Fig. 2 with drum 21 moving in counterclockwise direction (as viewed in Fig. 3) under the load supported by cable 22, with the brake band assembly AL engaged with the brake drum 21 and moving with it while assembly AR is loose on the brake drum and moving in the opposite direction from brake band assembly AL. Main brake valve 53 is in its normal closed position and valve 54 is in the open position, these control valves having previously been given these settings by the operator. With main brake valve 53 closed and valve 54 open, air flows from main line 50 through branch line 58, valve 54, pilot line 62, double check valve 57 and pilot line 63 to relay valve 19. The air flows through the double check valve 57 into line 63 because the slidable element of the double check valve is forced to the left extremity of valve 57 because the pressure in line 62 is greater than the air pressure in line 61, line 61 having been bled by main brake valve 53 which is of the bleeder regulator type. Relay valve 19 is held open by means of the pressure exerted through pilot line 63. With relay valve 19 open, air flows from main air line 50, through line 39 and valve 19 to branch lines 40L and 40R, thence to valve bodies 29L and 29R, respectively, of master valve assembly C. Slidable element 30L is in extreme left position in valve body 29L and consequently the air from line 40L flows through port 33L, passage 36L, port 34L and line 28L to the piston rod end of cylinder 24 of power unit BL; this causes air pressure to be exerted against the piston rod end of piston 25 and maintains brake band assembly AL tight on drum 21. While slidable element 30L of valve body 29L is in its extreme left position, the valve element 30R in body 29R is also in its extreme left position. With valve element 30R in this position air is prevented from passing from line 40R to the power assembly BR but instead the piston rod end of cylinder 24 is connected to the atmosphere through line 28R, port 34R, passage 37R and exhaust port 35R; this allows spring 27 to force the piston 25 toward the piston rod end of power assembly BR, thus maintaining brake assembly AR loose on brake drum 21. While brake band assembly AL is thus engaged and brake band assembly AR is disengaged, the piston 42L is moving upwardly while piston 42R is moving downwardly. The upward motion of the piston 42L is produced by the pull of cable 22 on brake drum 21, causing rotation thereof. Inasmuch as brake band assembly AL is engaged with brake drum 21, the brake band assembly AL is moving arcuately with the drum, thus causing the piston 42L to move upwardly in its cylinder 41L. As previously pointed out, cylinders 41L and 41R contain fluid and the lower ends of the pistons are fluidly connected by line 45 while the head ends of the cylinders are fluidly connected through lines 47R and 47L and the manifold consisting of lines 73, 76 and 79. As the piston 42L moves upwardly, the fluid contained in the upper portion of the cylinder of this assembly passes through line 47L, check valve 75, branch line 73, line 79 controlled by needle valve 70, branch line 76, check valve 77, and line 47R to the upper portion of the cylinder of assembly DR, forcing the piston 42R of the assembly downwardly therein. Since assembly AR is mechanically connected to piston 42R, the assembly AR is forced to move arcuately to follow the piston 42R. As brake band assembly AR reaches the end of its downward stroke, actuator 49R contacts valve 48R, thereby opening valve 48R momentarily, which in turn allows compressed air to flow from main air line 50, branch line 51 and branch line 52R through the valve 48R and pilot line 211, master valve N and pilot line 17L to port 38L of valve body 29L to push movable element 30L to its extreme right position from inlet port 38L; the thrust is transmitted through rod 31L, diaphragm 32 and rod 31R to element 30R so that at the same time element 30R is also moved to its extreme right position. Upon this movement of element 30L, flow of air from branch line 40L through valve body 29L is terminated and the piston rod end of cylinder 24 of assembly BL is bled to the atmosphere through port 34L, passage 37L and exhaust port 35L; this allows the spring 27 of assembly BL to drive the piston 25 of this assembly toward the piston rod end and releases brake band assembly AL from the brake drum 21. The simultaneous movement of element 30R to its extreme right position in valve body 29R allows air to flow through air line 40R, port 33R, passage 36R, outlet port 34R and line 28R into the piston rod end of the cylinder 24 of assembly BR, thereby driving the piston 25 of this assembly toward the head end of the cylinder and tightening brake band assembly AR on brake band 21. Tightened brake band assembly AR rotates with brake drum 21, thereby causing the piston 42R to move upwardly; simultaneously piston 42L is forced downwardly so that brake band assembly AL, mechanically connected to piston 42L, is moved arcuately in the direction opposite from the direction of movement of assembly AR. As brake band assembly AR rotates with drum 21, piston 42R moves upwardly toward the piston rod end of cylinder 41R. While the piston 42R is moving upwardly, piston 42L is moved downwardly, this downward movement of piston 42L being caused by the flow of fluid from cylinder 41R through conduit 47R, the manifold including lines 73, 79 and 76 and hydraulic line 47L to piston 41L. Inasmuch as brake band assembly AL is fluidly connected to the piston 42L, it is caused to move arcuately in cooperation with this piston. The movement of brake band assembly AL in due course brings actuator 49L into contact with pilot valve 48L and opens this valve momentarily. The opening of pilot valve 48L allows air to flow through pilot line 66, double check valve 202, pilot line 203, double check valve 204, pilot line 205, valve N and pilot line 17R which, in turn, causes movable element 30R in valve body 29R of master valve assembly C to move from its extreme right position to its extreme left position with the movement of this element transmitted through rod 31R, diaphragm 32 and rod 31L to movable element 30L in valve body 29L to move this element also from its extreme right position to its extreme left position; this change in the setting of master valve C admits air to the piston rod end of cylinder 24 of power unit BL and allows air to exhaust from cylinder 24 of power unit BR thereby tightening brake band assembly AL and releasing brake band assembly AR, thus allowing the cycle heretofore described to be repeated.

The linkage including pivoted lever 11 connected to brake band assemblies AL and AR, respectively, through linkages 13L and 13R is a safety feature. If a break should occur in the hydraulic system and the mechanical linkage were not provided, the pistons 42L and 42R could move to the head ends of pistons 41L and 41R simultaneously; this would allow a considerable shock to be placed on the drilling line 22 as well as on other parts of the system. The arrangement of the pivoted lever 11 mechanically connected to both brake band assemblies AL and AR insures that even though a leak or break should develop in the hydraulic system, the piston 42L and 42R are maintained in a fixed position in relationship with each other. It is to be mentioned that the pistons 42L and 42R do not follow the movement of the ends of pivoted lever 11 exactly, but any slight discrepancies in this respect may be taken care of by reservoirs of variable capacities, such as reservoir 232, in the hydraulic system.

The manipulation of valve members by the driller in order to control the movement of the hoisting drum will now be described. If it is desired to hold the hoisting drum 21 stationary, this may be done by moving the operating lever of the main brake valve 53 to open the valve which in turn allows air pressure to open diaphragm valve 56; main air pressure then enters pilot line 69 and passes through double check valve 67 and branch pilot line 68 to expand diaphragm member 32 which, in turn, moves element 30L in body 29L to its extreme left position and element 30R in valve body 29R to its extreme right position; opening main brake valve 53 also allows air to flow through double check valve assembly 57 and pilot line 63 to relay valve 19 and opens it whereby air from the main air line 50 is given access to inlet ports 33L and 33R of valve body 29L and 29R. The expansion of diaphragm element 32 together with admission of air through relay valve 19 to valve bodies 29L and 29R allows compressed air to pass through branch line 40L, passage 36L and to line 28L to the piston rod end of the cylinder of the assembly BL and through conduit 40R, passage 36R and conduit 28R to the piston rod end of the cylinder of assembly BR; this tightens brake band assemblies AL and AR simultaneously and prevents any rotation of drum 21.

The opening of main brake valve 53 which, in turn, opens diaphragm valve 56 also allows air to pass from main air line 50 through branch line 60, diaphragm valve 56, pilot line 69, and pilot line 210 so that compressed air is applied to diaphragm 242 of double diaphragm valve Q and diaphragm 245 of double diaphragm valve S; this opens valve Q, if it is not already open, and air is supplied to the pilot lines connected therewith so that pickup unit II, quick application unit III and drill-off unit IV, auxiliary thereto, are inactivated, and hydraulic valve 137R and 137L are closed. This closes double diaphragm valve S, if it is not already closed, and pressure is bled from diaphragm 126 of double diaphragm valve K and from diaphragm 151 of double diaphragm valve M so that torque control unit V and pickup unit VI are also inactivated. In other words, when the operator closes the main brake valve 53, he not only sets the brakes but also inactivates the automatic control equipment to insure that the operator, and only the operator, exercises command of the system at this time.

As long as the operator holds main brake valve 53 in the open position the drum is held stationary but if he releases the handle so that it can return to its neutral position, valve 53, which is of the bleeder regulator type, bleeds off the air from diaphragm 32 and relay valve 19 thereby releasing the brakes. Accordingly, if the driller wishes to leave the brakes set when he walks away from the main brake valve 53, it is necessary for him to open hand-operated valve 54 before releasing the operating handle of main brake valve 53. If valve 54 is open, then release of the operating lever of main brake valve 53 allows compressed air to pass from main air line 50 through branch line 58, valve 54 and pilot line 62, double check valve 57 and pilot line 63 to maintain pressure on relay 19. After the brakes have been set by the expansion of main brake valve 53 the diaphragm 32 is extended and remains extended while the operator changes his method of control by opening valve 54 and releasing the operating handle of main valve 53.

The manipulative steps for bringing the unit from rest to normal rotation under load are as follows:

If valve 54 has not been opened upon the operation of main brake valve 53, it is now opened and the operating handle of main brake valve 53 is released and allowed to assume its neutral position. These steps allow the double check valve 57 to respond to pressure in line 62 with air passing through line 58, valve 54, pilot line 62, double check valve 57, and pilot line 63 to relay 19. The return of the end lever of main brake band 53 to neutral position allows the air to be bled from pilot line 61 which, in turn, causes diaphragm valve 56 to close. To assure that the valve elements 30L and 30R of master valve assembly C are in their proper positions, it is desirable to move these elements in a known position at that time; this could be done by operating manually either valve 48L or 48R but, for convenience, valve 55 is connected in parallel with valve 48L and operation of this valve allows air to pass from main air line 50, branch line 59, valve 55, pilot line 65 to double check valve 204. The admission of pressure through pilot line 65 controls the position of double check valve 204 and allows air to pass on through pilot line 205, valve N and pilot line 17R to the inlet port 38R of master valve assembly C which causes valve elements 30R and 30L of master valve assembly C to be moved to their extreme left positions. In other words, a momentary opening of valve 55 by the operator positions valve elements 30L and 30R to insure that air will flow into the rod end of the cylinder of assembly BL to tighten brake band assembly AL and that air is exhausted from the rod end of the cylinder of assembly BR to allow the release of assembly AR from hoisting drum 21. The momentary opening of valve 55 by the operator is the last manipulative step in the starting operation and the assembly then pays out line or walks at a speed which is controlled by the rate hydraulic liquid flows through needle valve 70 as long as drilling conditions remain normal.

If it is desired to release both brake band assemblies AL and AR simultaneously, as when running a drill stem into a borehole, this may be done by first opening main brake valve 53 to tighten assemblies AL and AR simultaneously on hoisting drum 21 and then allowing the operating handle of this valve to return to neutral position while valve 54 remains closed. Inasmuch as main brake valve 53 is of the bleeder regulator type, the return of the operating handle to neutral position after tightening both brake bands allows air to bleed from relay 19 through pilot line 63, double check valve 57 and pilot line 61 to the bleeder port of main brake valve 53 and this, in turn, allows relay valve 19 to close and bleed air from power assembly BL through branch line 28L, valve body 29L, branch line 40L and from power assembly BR through branch line 28R, valve body 29R and branch line 40R, thereby simultaneously releasing brake band assemblies AL and AR.

*Operation of weight control unit II*

In the normal feed-off operation of basic unit I, the rate of feed-off is controlled by the setting of needle valve 70. In the system of the present application, the setting of this needle valve may be automatically adjusted by weight control unit II in accordance with the weight carried by the drilling line. When the operator momentarily closes feed-off starting valve 55, to start the hoisting drum to rotate, the air pressure is transmitted not only through pilot line 65, double check valve 204, pilot line 205, valve H and pilot line 17R to insure the proper positioning of the valve elements in master valve assembly C but, in addition, is applied through pilot lines 65 and 206 against diaphragm 241 of double diaphragm valve Q, closing this valve and allowing air to be bled from pilot lines connected with its outlet so that weight control unit II is placed in operation and against diaphragm 244 of double diaphragm valve S to open this valve so that the pressure in the steam chest line 138 has access to the diaphragm 126 of valve K and diaphragm 151 of valve M to put torque control unit V and pickup unit VI in operation.

When weight control unit II becomes activated by the closing of valve Q, diaphragm valve 15 opens and compressed air flows from main air line 50 through line 16 and valve 15 to branch line 108 and valve E and to branch line 109 and valve F. The supply of air to valves E and F causes the valve elements in these valves to reciprocate as well as the reciprocation of pistons 101 in motor units GL and GR. Assuming that the movable valve element 86 of valve E is in its left position, compressed air passes through line 108, port 83, passage 88, outlet port 85L and line 106 where it is applied through port 92R against valve element 96 of valve assembly F and forces valve element 96 to its left position. When valve element 96 of assembly F is in its left position compressed air passes through inlet line 109, port 93, passage 98 and outlet port 95L through line 104L and into cylinder 100 of assembly GL. The compressed air supplied to cylinder 100 of unit GL not only causes the piston to reciprocate but, in addition, passes through line 105L where it is applied through port 82L of valve assembly E forcing movable element 86 to move from its left to its right position. When the valve element 86 moves to its right position compressed air is allowed to pass through line 108, inlet port 83, passage 88, outlet port 85R and line 107 to inlet port 92L of valve assembly F and forces valve element 96 of this assembly to its right position; with valve element 86 of assembly E in its right position, the port 92R of valve assembly F is connected through line 106, port 85L and passage 89 to exhaust port 84L which relieves the pressure on the right end of the valve assembly F allowing valve element 96 to move to the right. When valve element 96 moves to its right position, compressed air passes through line 109, port 93, passage 98 and outlet port 95R through line 104R to unit GR. The compressed air supplied to unit GR not only causes the piston 101 in this unit to reciprocate but, in addition, a portion passes through line 105R where it is applied through port 82R of valve assembly E and forces valve element 86 of valve E to return to its initial left position. As long as compressed air has access to valves E and F of weight control unit II, the motors GL and GR reciprocate continuously. As long as the weight suspended from drilling line 22 remains within the predetermined range, the needle J of weight indicator, not shown, remains at a mid-point position between valves 110L and 110R and these bleeder valves are not opened so that the air pressure in branch lines 118 and 120 remains at a constant value. However, when the weight carried by the drilling line becomes either excessive or too light needle valve J moves away from its midpoint position. If the weight carried becomes less than desired, needle valve J moves to the left so that bleeder valve 110L strikes the needle J each time the piston 101 in unit GL reciprocates thereby bleeding air from line 118 through bleeder valve 110L which, in turn, actuates unit HR and causes the pawl member 115 of this unit to move upwardly which, in turn, moves valve wheel 72 in the counterclockwise direction thereby opening valve 70 and allowing an increased flow of hydraulic fluid through lines 47L and 47R. This increases the rate of pay-off of hoisting 21 of basic assembly I. If the weight carried by the drilling line becomes excessive, needle J moves to the right and bleeder valve 110R will strike it each time piston 101 of unit GR reciprocates and this, in turn, will allow air to bleed from unit HL through branch line 122L, line 120 and bleeder valve 110R to reduce the air pressure in the cylinder of unit HL, causing the piston of unit HL to reciprocate which, in turn, rotates valve wheel 72 of needle valve 70 in the clockwise direction to reduce the flow of hydraulic fluid through line 47L and 47R; this decreases the rate of rotation of drum 21 of basic unit I.

*Operation of quick application unit III*

The quick application unit III cooperates with the weight control unit II and basic unit I. With the basic unit I paying out drilling line in normal feed-off operations and with the weight control unit II in command, if the drilling conditions are such that the weight becomes less than desired, as when the drill bit abruptly passes from a hard formation to a soft, easily drilled formation, the weight control unit II attempts to make a correction in that needle J of the weight indicator moves to the left causing each stroke of air motor unit GL to bleed air from bleeder valve 110L. The discharge of air through bleeder valve 110L causes actuator HR to operate, each stroke of actuator HR causing valve wheel 72 to move through a portion of a revolution. If the weight carried by the drilling line 22 does not become normal after the air has been bled through bleeder valve 110L a given number of successive strokes, the quick application unit III is caused to operate. The quick application unit III operates at this time because the air bled off through bleeder valve 110L reduces the pressure in pilot line 222 and in the diaphragm of diaphragm valve 228 to such an extent that the valve element of valve 228 (not shown in the drawing) is momentarily moved from its closed position to its full open position and allows hydraulic fluid to flow through the by-pass line 227. This momentary opening of valve 228 allows the hoisting drum 21 to rotate at an increased rate which, in turn, allows hoisting line 22 to pay out at a faster rate than that prevailing when valve 228 remains closed and the hydraulic fluid is all forced to flow through needle valve 70. With the pressure reduced in pilot line 222 as described, the air supplied to branch line 118 through throttling valve 117 is such that subsequent successive strokes of air motor GL causes throttling valve 228 to be momentarily open upon each stroke of air motor unit GL until the weight carried by the drill stem increases to an amount within the predetermined range and pointer J returns to its central position whereupon the bleeding of air through valve 110L is stopped and the pressure in pilot line 222 and in the diaphragm of valve 228 builds up to its normal value and valve 228 then assumes its normal closed position.

*Operation of drill off unit IV*

The drill off unit IV also cooperates with basic unit I and weight control unit II. Drill off unit performs a particularly useful function when the drill passes abruptly from a relatively soft to a relatively hard formation, that is to say, when the normal drilling speed must change abruptly from a relatively rapid rate to a relatively slow rate. In weight control unit II the air replacing that bled off through bleeder valve 110R is supplied from main air line 50 by branch line 116 controlled by orifice or valve needle 117 and thence through branch line 120; drill off unit IV provides a supplementary connection by way of pilot line 217 controlled by orifice or needle valve 218 and pilot line 124 controlled by valve 219. The flow areas of valves 117, 218 and 219 are so proportioned that the air bled off through bleeder valve 110R after a certain number of consecutive strokes, say three strokes, lowers the pressure in the diaphragm of diaphragm valve T sufficiently to allow valve T (which is normally closed) to open which, in turn, causes air to flow through line 215, valve T, line 216, double check valve 132, line 133, double check valve 134, line 135, and from line 135 to branch lines 136R and 136L to the diaphragm of valves 137R and 137L, respectively, and through pilot line 221 to the diaphragm of diaphragm valve 123. The compressed air applied against the diaphragms of diaphragm valves 123, 137R and 137L causes these valves to close. The closing of diaphragm valves 137L and 137R stops the flow of hydraulic fluid in basic system I and prevents feed-off of drilling line 22. The closing of valve 123 prevents the actuator HL from operating as air is bled from bleeder 110R with each stroke of air motor GR. Thus needle valve 70 of the hydraulic system is not progressively closed by successive strokes of air motor GR if a long period of time is required to deepen the hole enough to reduce the weight on the drill bit to the predetermined range and at the same time hoisting drum 21 is held against rotation to allow the drill bit to "drill off." The valves 137R and 137L and valve 123, after they are once closed, are held in this position by subsequent strokes of air motor GR actuating bleeder valve 110R which keeps the pressure applied against the diaphragm of valve T reduced until such time as the desired weight on the drill bit has been reached. When the weight on the bit is reduced to the predetermined range, pointer J resumes its central position, this brings it out of contact with bleeder valve 110R and stops the bleeding of air through valve 110R which, in turn, allows pressure to build up in pilot line 124 which allows diaphragm valve T to close. Valve T is of the bleeder type so that when it closes air is bled to the atmosphere from lines 216, 133, 135, branch lines 136L, 136R and pilot line 221 and this reduction in the pressure allows valves 137R, 137L and 123 to open. With the opening of the valves 137R and 137L and 123 the weight control system II is again in command.

*Operation of torque control unit V*

It has been heretofore explained that the operator puts the system in operation for feeding off the drill line 22 by momentarily opening feed-off starting valve 55. The momentary opening of this valve allows air pressure to be applied against diaphragm 244 of double diaphragm valve S opening this valve and allowing the pressure in steam chest line 138 to be applied against the diaphragm of double diaphragm valve K of the torque control. As long as the torque exerted by the drilling engine as indicated by the pressure in the steam chest line 138 is less than a predetermined value, the torque control unit V remains inactivated. However, when the torque exerted by the drilling engine reaches a predetermined value, the pressure in the steam chest line increases to a predetermined value and this increase pressure applied against diaphragm 126 of double diaphragm valve K causes this valve to open thereby allowing compressed air to pass from main air line 50 through branch line 128, double diaphragm valve K, double check valve 130, and pilot line 131. The pressure applied through line 129 to double check valve 130 serves to block off double diaphragm valve Q while the pressure transmitted through pilot lines 131 and 141 to the diaphragm of diaphragm valve 15 closes this valve; this arrangement insures that weight control unit II and its auxiliary units, quick application unit III and drill off unit IV, are inactivated and that torque control unit V is in complete command at this time. The air pressure in line 131 also passes through double check valve 132, line 133, double check valve 134, line 135 and branch line 136R and 136L to apply the pressure against the diaphragm of diaphragm valves 137R and 137L, closing these valves which, in turn, stops flow of hydraulic fluid through lines 47R and 47L, thereby stopping all rotation of hoisting drum 21. The pressure in pilot line 135 is also transmitted through pilot line 221 and closes diaphragm valve 123 of drill off unit IV; however, this makes no difference one way or the other because this unit is inactivated. Valves 137R and 137L remain closed as long as the torque exerted by the drilling engine is greater than a predetermined value. When the torque exerted by the drilling engine becomes less than said predetermined value the pressure exerted against diaphragm 126 of double diaphragm valve K decreases so that it is overcome by the constant pressure valve applied against diaphragm 127 of the double diaphragm valve K through pilot line 139 connected through regulator 140 to compressed air main 50. Double diaphragm valve K is of the bleeder type and upon closing air is bled to atmosphere from lines 131, 133, 135, 136R, 136L and from the diaphragm of diaphragm valves 137R and 137L, allowing valves 137R and 137L to open and hydraulic fluid to circulate through line 137R and 137L. The air pressure is also bled off through pilot line 141 from the diaphragm of valve 15 thereby allowing this valve to open and weight control unit II to again assume command of the system.

Operation of pickup assembly VI

When the torque exerted by the drilling engine exceeds a predetermined value, which value is greater than that required to activate torque control unit V, the pressure increases in steam chest line 138 to such an extent that the pressure exerted on diaphragm 151 of double diaphragm valve M causes this valve to open so that the pickup assembly VI is activated. In other words, parts of the entire system are coordinated so that torque control unit V is first activated to stop further payoff of the drilling line 22 and if this operation is inadequate and the torque increases then command is assumed by pick-up assembly VI. Since torque control unit V has previously had command, weight control unit II and its auxiliary units, quick application unit III and drilloff unit IV, have been inactivated; valve K of torque control unit V remains open so units II, III and IV remain inactivated when pickup assembly VI assumes command.

The opening of double diaphragm valve M allows air to pass from main air line 50 through pilot line 153, valve M, pilot line 154, double check valve 155, pilot line 157 to pilot line 158 where the stream of air is split with one portion passing through double check valve 134 to pilot line 135. This portion going to pilot line 135 will normally merely maintain part of the system in the state it was placed by the torque control unit V when it was in command, namely, the maintenance of pressure against the diaphragms of diaphragm valves 137R and 137L to prevent the flow of fluid through needle valve 70 of weight control unit II. The other portion of the compressed air discharged to pilot line 158 serves to activate several units. Air pressure applied to the diaphragm of diaphragm valve 159 causes this valve to open which, in turn, allows compressed air to pass from main line 50 to pump P thereby supplying power to the pump and causing it to begin operation. The compressed air is transmitted from pilot line 158 through pilot line 164 where it is exerted against the diaphragm of diaphragm valve 163 causing this valve to open. The pressure exerted from pilot line 158 is also transmitted through branch pilot line 167, through port 171 of master valve N where it is applied against the right end of movable valve element 176 of valve N and forces this element to move to its left position where it is held by the air pressure continuously exerted through pilot line 167. The pressure in pilot line 158 is exerted against the diaphragm of diaphragm valve 165 through pilot line 166 and causes this valve to open and is exerted against the diaphragm of diaphragm valve 168 through pilot line 169 and causes this valve to open. Compressed air flows momentarily from pilot line 158 through pilot line 200, normally open diaphragm valve 160, pilot line 201, double check valve 202, pilot line 203, double check valve 204, and pilot line 205, where the stream is split, with a portion passing through pilot line 209 controlled by diaphragm valve 168 and applying pressure through port 182 of valve O to force element 188 to its right position, and the other portion passing through valve N, and pilot line 17L where it is applied through port 38L of master valve assembly C and forces members 30L and 30R of this assembly to their extreme right positions. At the same time air begins to flow through normally open valve 160 it also passes through pilot line 161 and leaks through orifice or needle valve 162 to the diaphragm of diaphragm valve 160; as soon as the air leaking through needle valve 162 builds up sufficient pressure it closes diaphragm valve 160 which is of the bleeder type and bleeds off air pressure from line 201 so that the air pressure thereafter passing through double check valve 202 is controlled by pilot valve 48L. In other words, valve 160 insures proper positioning of the valve elements in master valve O and master valve assembly C when pickup unit VI takes command.

The manner in which the master valve assembly C of unit I and master valve O of pickup unit IV are synchronized when pickup unit VI is activated will be seen by tracing the flow as follows:

Assume valve element 188 of valve O and valve elements 30L and 30R of master valve assembly C are in their right positions. These valve elements may be thus positioned by the momentary flow of air through valve 160 when activating the pickup unit VI or after the unit has been put into operation, by contact of activator 49L with feed-off valve 48L which momentarily opens valve 48L and allows compressed air to pass from main air line 50 through branch line 51, line 52L, valve 48L, pilot line 66, double check valve 202, pilot line 203, double check valve 204 and pilot line 205 where the air stream is split, one portion passing through pilot line 209 and end port 182 of valve O to force movable valve element 188 to the right while the other portion of the stream enters valve N through inlet port 173 and leaves through outlet port 172 passing through pilot line 17L and imposing pressure on master valve assembly C through end port 38 to force the movable valve elements 30L and 30R of master valve assembly C to their extreme right positions. With movable parts 30L and 30R of master valve assembly C to their extreme right positions, compressed air from the main air line can enter power assembly BR so that brake band assembly AR is tightened on the hoisting drum 21 while air is bled from the atmosphere from power assembly BL causing assembly AL to be released. The movement of movable part 188 of valve O to its right position allows hydraulic fluid to be forced by pump P through line 214, diaphragm valve 163 and hydraulic line 47R where it is applied to the piston end of cylinder 41R causing the piston 42R to be forced downwardly pulling with it the brake band assembly AR which is tight on the drum 21 and pulls the drum with it. As the piston 42R reaches the end of its stroke, activator 49R contacts feed-off valve 48R which allows compressed air to pass through pilot line 211, port 175, passage 178 and to port 174 of valve N, the stream is then split with a portion flowing through pilot line 212 controlled by diaphragm valve 165 and imposing a pressure against the right end of master valve O causing movable element 188 of this valve to move to its left position while the other portion of the split stream passes through pilot line 17R and imposes a pressure through end port 38R of master valve assembly C causing movable parts 30L and 30R of master valve assembly C to move to their extreme left positions. The movement of parts 30L and 30R of master valve C to their left positions allows air pressure to enter power assembly BL thereby tightening brake band assembly AL on hoisting drum 21 and at the same time bleeds air from power assembly BR thereby releasing brake band assembly AR from the drum. Simultaneously with the tightening of brake band assembly AL onto the drum, the movement of movable valve element 188 of master valve O to its left position allows hydraulic fluid to be pumped by pump P through line 196, port 187, passage 191 and port 184 of valve O, line 213 and hydraulic line 47L where the hydraulic fluid enters the piston rod end of cylinder 41L and forces the piston 42L downwardly, this movement causing brake band assembly AL to move downwardly and since this assembly is tight on the hoisting drum 21 it forces hoisting drum 21 to move in clockwise direction (as viewed from Fig. 3).

The valve elements of master valve O and master valve assembly C remain synchronized as long as the pickup system VI is activated. When the torque being exerted by the drilling engine diminishes to a value below that selected to activate the pickup assembly VI, the pressure in steam chest line 38 diminishes to a predetermined value, the valve element of double diaphragm valve M closes and with such closing bleeds off air pressure from pilot lines 154, 157 and 158 and from the valves and lines connected to lines 158, that is, pilot line 161 and the diaphragm of diaphragm valve 160, pilot line 200, pilot line 164, the diaphragm of diaphragm 163, pilot line 166 and the diaphragm of diaphragm valve 165, pilot line 167, pilot line 169 and the diaphragm of valve 168 and the diaphragm of diaphragm valve 159. The bleeding of pressure from these various valves allows the movable valve element 176 of valve N to return to its normal position in the left side of valve body 170, closes the connection between pump P and hydraulic lines 47R and 47L and closes the connection between valve O and the feedoff activating valves 47L and 47R so that the pickup assembly IV is no longer activated. As heretofore explained, the double diaphragm valve K of torque control unit V remains open when pickup unit IV takes command and when pickup unit VI relinquishes command the compressed air applied through valve K, pilot line 129, double check valve 130, pilot line 131, double check valve 132, and pilot line 133 against double check valve 134 takes command as air is bled from pilot line 158, so that compressed air entering through double diaphragm valve K of torque control unit V is applied against the diaphragm of diaphragm valves 137R and 137L and maintains these valves closed.

If the torque continues to decrease, the decrease in pressure applied against diaphragm 126 of double diaphragm valve K of torque control unit V will close thereby inactivating torque control unit V and putting weight control unit II with its auxiliary units, quick application unit III and drilloff unit IV, in command.

While I have disclosed a preferred embodiment of the present invention, it will be obvious to a workman skilled in the art that various changes may be made in the arrangements of the several parts of the system and selection of suitable parts making up the system without departing from the scope of the invention.

Having fully described and illustrated a preferred embodiment of the present invention, what I desire to claim as new and useful and to secure by Letters Patent is:

1. A device for controlling the operation of a rotary drilling rig having a drill stem adapted to carry a drilling bit at its lower end with a steam actuated drilling engine arranged for rotating the drill stem and a hoisting drum, a hoisting line connected to the hoisting drum for supporting a portion of the weight of the drill stem during drilling operations comprising, in combination, a multiple cylinder pump operatively connected with the hoisting drum for operation of the pump upon rotation of the hoisting drum, a hydraulic circuit fluidly connecting like ends of at least two cylinders of said multiple cylinder pump including a first valve and a second diaphragm actuated valve, said first valve having a variable flow area, a weight control means arranged to vary the flow area of said first valve upon changes in the weight carried by the hoisting line during drilling operations, said weight control means including an inlet compressed air line controlled by a third diaphragm actuated valve and powered by compressed air supplied through said inlet compressed air line, a torque control assembly including a fourth diaphragm actuated valve with its actuator fluidly connected to the steam chest line of the drilling engine and its outlet connected by pilot lines to the diaphragm actuators of said second valve and third valve whereby excess pressure in the steam chest line will actuate said second diaphragm valve and said third diaphragm valve through the medium of the fourth diaphragm valve.

2. A device for controlling the operation of a rotary drilling rig having a drill stem adapted to carry a drilling bit at its lower end with a steam actuated drilling engine arranged for rotating the drill stem and a hoisting drum for supporting a portion of the weight of the drill stem during drilling operations comprising, in combination, a first multiple cylinder pump operatively connected with the hoisting drum for operation of the pump upon rotation of the hoisting drum, a second pick-up pump operatively connected to a prime mover, a hydraulic circuit fluidly connecting like ends of at least first and second cylinders of said multiple cylinder pump including a first valve having a variable flow area, a second diaphragm actuated valve in the circuit between said first cylinder of the pump and said first valve, a third diaphragm actuated valve in the circuit between said second cylinder of the pump and said first valve and connection lines in one of which is a fourth diaphragm actuated valve connecting said second pump to said hydraulic circuit at points between said second and third valves and said cylinders of said first pump, a weight control means arranged to vary the flow area of said first valve upon changes in the weight carried by the drilling line during drilling operations, said weight control means including an inlet compressed air line controlled by a fifth diaphragm actuated valve and powered by compressed air supplied through said inlet compressed air line, a first torque control assembly including a sixth diaphragm actuated valve with its actuator fluidly connected to the steam chest line of the drilling engine and its outlet connected by pilot lines to the diaphragm actuators of said second valve, third valve and fifth valve and a second torque control assembly including a seventh diaphragm actuated valve with its actuator fluidly connected to the steam chest line of the drilling engine and its outlet connected by pilot lines to the diaphragm actuator of said fourth valve whereby excess pressure in the steam chest line will actuate said second and third diaphragm valves and the fifth diaphragm valve through the media of the sixth and seventh diaphragm valves.

3. A device for controlling the operation of a rotary drilling rig having a drill stem adapted to carry a drilling bit at its lower end with a steam actuated drilling engine arranged for rotating the drill stem and a hoisting drum, a hoisting line connected to the hoisting drum for supporting a portion of the weight of the drill stem during drilling operations comprising, in combination, a first pump assembly including a cylinder with a piston slidable therein, a first brake band assembly mounted on said hoisting drum, a first fluid motor carried by the first brake band assembly adapted to engage releasably the brake band assembly with the hoisting drum, means mechanically linking said first brake band assembly with the piston of said first pump assembly, a second pump assembly including a cylinder with a piston slidable therein, a second brake band assembly mounted on said hoisting drum, a second fluid motor mounted on said second brake band assembly adapted to engage releasably said brake band assembly with said hoisting drum, means mechanically linking said second brake band assembly with the piston of said second pump assembly, a third pump, a hydraulic circuit fluidly connecting like ends of the cylinders of said first and second pump assemblies and including a manifold with a needle valve for throttling the flow of fluid therethrough, and fluid connections controlled by a first diaphragm activated valve connecting said third pump into said hydraulic circuit, said fluid connections including a first compressed air actuated master valve with a valve element arranged to assume a first position wherein the output of the third pump is imposed on said first pump assembly to convert the first pump into a fluid motor and a second position where the output of the third pump is imposed on the second pump assembly to convert it to a fluid motor, a compressed air control circuit including a second master valve assembly having movable elements arranged to assume a first position supplying compressed air to the first fluid motor and releasing compressed air from the second fluid motor and arranged to assume a second position releasing compressed air from the first fluid motor and supplying compressed air to the second fluid motor, a third master valve having a valve element adapted to assume a normal position and a pick-up position, a first pilot valve mounted adjacent the first brake band assembly and adapted to be activated by said assembly when it moves to a given position and a second pilot valve mounted adjacent said second brake band assembly and adapted to be activated by said assembly when it moves to a given position, pilot line circuits connecting said first and second pilot valves, respectively, through said third master valve to said second master valve assembly whereby when the valve element of the third master valve is in its normal position activation of first pilot valve causes the movable part of the second master valve assembly to move from its second position to its first position thereby engaging the first brake band assembly and disengaging the second brake band assembly and wherein activation of the second pilot valve causes the movable part of the master valve assembly to move from its first position to its second position thereby engaging the second brake band assembly and releasing the first brake band assembly and wherein movement of the valve element of the third master valve from its normal position to its pick-up position crosses the pilot line circuits between the first and second pilot valves and the second master valve assembly, and a second diaphragm activated valve with its actuator fluidly connected to the steam chest line of the drilling engine and its outlet connected by pilot lines to the third master valve and the first diaphragm actuated valve whereby an increase in pressure in the steam chest line beyond a predetermined value causes the second diaphragm valve to open and in turn causes the first diaphragm actuated valve to open and the valve element of the third master valve assembly to move from its normal position to its pick-up position.

4. A control device for a rotary drilling rig having a drill stem adapted to carry a drill bit at its lower end and to be rotated by a steam actuated drilling engine with a portion of the weight of the drill stem carried by a drilling line connected to a hoisting drum during drilling operations comprising, in combination, a first multiple cylinder pump mechanically connected to the hoisting drum to cause operation of said pump upon rotation of the hoisting drum when paying out the drilling line, a second pick-up pump, a hydraulic circuit fluidly connecting like ends of a first and a second cylinder of said first multiple cylinder pump including a first valve having a variable flow area, a second diaphragm actuated valve in the circuit between said first cylinder of the first pump and said first valve, a third diaphragm actuated valve in the circuit between said second cylinder of the first pump and said first valve and connection lines in one of which is a fourth diaphragm actuated valve connecting said second pump to said hydraulic circuit at points between said second and third valves and said cylinders of said first pump, a torque control assembly including a fifth and a sixth diaphragm actuated valves with the actuators of each of these valves fluidly connected to the steam chest line of the drilling engine and the outlet of said fifth valve are separately connected through different inlets of a double check valve the outlet of which is connected through pilot lines to the diaphragm actuators of said second and third diaphragm actuated valves and in which the outlet of said sixth diaphragm actuated valve is additionally connected through pilot lines to the diaphragm actuator of said fourth diaphragm valve whereby when the pressure in the steam chest line of the drilling engine exceeds a predetermined value the second and third diaphragm valves will be closed and when the pressure in the steam chest line of the engine exceeds another and greater predetermined value the second and third diaphragm valves will remain closed and the fourth diaphragm valve will be opened so that liquid may discharge from said second pick-up pump to said first multiple cylinder pump thereby converting said first multiple cylinder pump to a motor.

ROBERT R. CROOKSTON.

REFERENCES CITED

The following references are of record in the file of this patent:

UNITED STATES PATENTS

| Number | Name | Date |
|---|---|---|
| 1,798,797 | Jones et al. | Mar. 31, 1931 |
| 1,804,779 | Jones et al. | May 12, 1931 |
| 1,836,998 | Thullen | Dec. 15, 1931 |
| 1,859,814 | Wyckoff | May 24, 1932 |
| 1,913,752 | Goldman | June 13, 1933 |
| 1,919,611 | Besigk | July 25, 1933 |
| 2,136,356 | Hild | Nov. 8, 1938 |
| 2,371,953 | Crake | Mar. 20, 1945 |
| 2,382,027 | Rose | Aug. 14, 1945 |
| 2,455,917 | Crake | Dec. 14, 1948 |
| 2,489,449 | Crookston | Nov. 29, 1949 |
| 2,534,700 | Crookston | Dec. 19, 1950 |